(12) United States Patent
Chen et al.

(10) Patent No.: US 12,096,006 B2
(45) Date of Patent: Sep. 17, 2024

(54) TILE AND SLICE PARTITIONING IN VIDEO PROCESSING

(71) Applicant: ALIBABA GROUP HOLDING LIMITED, Grand Cayman (KY)

(72) Inventors: Jie Chen, Beijing (CN); Yan Ye, San Diego, CA (US); Ru-Ling Liao, Beijing (CN)

(73) Assignee: Alibaba Group Holding Limited, Grand Cayman (KY)

(*) Notice: Subject to any disclaimer, the term of this patent is extended or adjusted under 35 U.S.C. 154(b) by 0 days.

(21) Appl. No.: 18/161,453

(22) Filed: Jan. 30, 2023

(65) Prior Publication Data

US 2023/0171415 A1   Jun. 1, 2023

Related U.S. Application Data

(63) Continuation of application No. 17/326,772, filed on May 21, 2021, now Pat. No. 11,601,655.
(Continued)

(51) Int. Cl.
| | |
|---|---|
| H04N 19/174 | (2014.01) |
| H04N 19/119 | (2014.01) |
| H04N 19/30 | (2014.01) |
| H04N 19/70 | (2014.01) |
| H04N 19/96 | (2014.01) |

(52) U.S. Cl.
CPC ......... *H04N 19/174* (2014.11); *H04N 19/119* (2014.11); *H04N 19/30* (2014.11); *H04N 19/70* (2014.11); *H04N 19/96* (2014.11)

(58) Field of Classification Search
CPC .......................... H04N 19/174; H04N 19/119
See application file for complete search history.

(56) References Cited

U.S. PATENT DOCUMENTS

| | | |
|---|---|---|
| 2014/0218473 A1 | 8/2014 | Hannuksela et al. |
| 2018/0270480 A1 | 9/2018 | Zhang et al. |

(Continued)

FOREIGN PATENT DOCUMENTS

| | | |
|---|---|---|
| JP | 2023519612 A | 5/2023 |
| WO | 2021204136 A1 | 10/2021 |

OTHER PUBLICATIONS

"Requirements for a Future Video Coding Standard v5," International Organisation for Standardisation, Torino, IT, 14 pages (2017).
(Continued)

*Primary Examiner* — Jerry T Jean Baptiste
(74) *Attorney, Agent, or Firm* — Finnegan, Henderson, Farabow, Garrett & Dunner, LLP

(57) ABSTRACT

The present disclosure provides a computer-implemented method for encoding or decoding video. The method includes encoding or decoding, in a plurality of picture parameter sets (PPS) associated with pictures of a coded layer video sequence (CLVS), corresponding first PPS flags indicating whether pictures are allowed to be partitioned into a plurality of tiles or slices. In a first PPS, a corresponding first PPS flag with a first value indicates a first picture of the CLVS is unpartitioned, and in a second PPS, another corresponding first PPS flag with a second value being different from the first value indicates that a second picture of the CLVS is allowed to be partitioned.

17 Claims, 34 Drawing Sheets

Related U.S. Application Data

(60) Provisional application No. 63/028,111, filed on May 21, 2020.

(56) References Cited

U.S. PATENT DOCUMENTS

| | | | |
|---|---|---|---|
| 2019/0012839 A1 | 1/2019 | Wang | |
| 2021/0195223 A1* | 6/2021 | Chang | H04N 19/137 |
| 2021/0329303 A1* | 10/2021 | Deshpande | H04N 19/70 |

OTHER PUBLICATIONS

Bross et al., "Versatile Video Coding (Draft 8)," JVET-Q2001-vD, 17th Meeting: Brussels, BE, Jan. 7-17, 2020, 509 pages.
Chen et al., "Algorithm Description of Joint Exploration Test Model 7 (JEM 7)," JVET-G1001-v1, 7$^{th}$ Meeting: Torino, IT, Jul. 13-21, 2017, 50 pages.
Chen et al., "Algorithm Description of Joint Exploration Test Model 8 (JEM 8)," JVET-Q2002-v1, 17$^{th}$ Meeting: Brussels, BE, Jan. 7-17, 2020, 91 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/svn_HMJEMSoftware.
Sullivan et al., "Overview of the High Efficiency Video Coding (HEVC) Standard," IEE Transactions on Circuits and Systems for Video Technology, vol. 22, No. 12, pp. 1649-1668 (2012).
PCT International Search Report and Written Opinion mailed Aug. 25, 2021, issued in corresponding International Application No. PCT/US2021/033608 (9 pgs.).
Bross et al., "Versatile Video Coding (Draft 7)," JVET-P2001-vE, 16th Meeting: Geneva, CH, Oct. 1-11, 2019, 488 pages.
Bross et al., "Versatile Video Coding (Draft 9)," JVET-R2001-vB, 18th Meeting: by teleconference, Apr. 15-24, 2020, 523 page.
Chen et al., "AHG12: On tile and slice partitioning related syntax and semantics," 19th Meeting: by teleconference, Jun. 22-Jul. 1, 2020, 8 pages.
Deng et al., "AHG12: some cleanups on subpicture signalling," JVET-R0071-v1, 18th Meeting, by teleconference, Apr. 15-24, 2024, 2020, 4 pages.
Hsiang et al., "AHG9: Signalling rectangular slice partitioning," JVET-R0247-v3, 18th Meeting by teleconference, AT, Apr. 15-24, 2024, 2020, 3 pages.
Hsiang et al., "AHG9: Supporting multiple slices within one tile for raster-scan slice mode," JVET-R0248-v3, 18th Meeting: by teleconference, Apr. 15-24, 2020, 7 pages.
Japanese Office Action issued in corresponding Japanese Application No. 2022-570265 on May 9, 2024 (9 pages).
Japanese Search Report issued in corresponding Japanese Application No. 2022-570265 on Apr. 15, 2024 (49 pages).
Lee et al., "AHG12: Cleanups on rectangular slices signalling," JVET-R0211, 18th Meeting: by teleconference, Apr. 15-24, 2020, 6 pages.
European Patent Office Communication issued for Application No. 21807806.1 the Supplementary European Search Report (Art. 153(7) EPC) and the European search opinion dated Jun. 3, 2024, 8 pages.
Sullivan et al., "Agenda and report of the Category 1 AHG pre-meeting for the 18th JVET meeting," JVET-R0339-vB, 18$^{th}$ Meeting by teleconference, Apr. 15-24, 2020, 59 pages.

* cited by examiner

| seq_parameter_set_rbsp( ) { | Descriptor |
|---|---|
| ... | u(2) |
| sps_subpic_info_present_flag | u(1) |
| if( sps_subpic_info_present_flag ) { | |
|   sps_num_subpics_minus1 | ue(v) |
|   if( sps_num_subpics_minus1 > 0 ) | |
|     sps_independent_subpics_flag | u(1) |
|   for( i = 0; sps_num_subpics_minus1 > 0 && i <= sps_num_subpics_minus1; i++ ) { | |
|     if( i > 0 && sps_pic_width_max_in_luma_samples > CtbSizeY ) | |
|       sps_subpic_ctu_top_left_x[ i ] | u(v) |
|     if( i > 0 && sps_pic_height_max_in_luma_samples > CtbSizeY ) { | |
|       sps_subpic_ctu_top_left_y[ i ] | u(v) |
|     if( i < sps_num_subpics_minus1 && <br>      sps_pic_width_max_in_luma_samples > CtbSizeY ) | |
|       sps_subpic_width_minus1[ i ] | u(v) |
|     if( i < sps_num_subpics_minus1 && <br>      sps_pic_height_max_in_luma_samples > CtbSizeY ) | |
|       sps_subpic_height_minus1[ i ] | u(v) |
|     if( !sps_independent_subpics_flag) { | |
|       sps_subpic_treated_as_pic_flag[ i ] | u(1) |
|       sps_loop_filter_across_subpic_enabled_flag[ i ] | u(1) |
|     } | |
|   } | |
|   sps_subpic_id_len_minus1 | ue(v) |
|   sps_subpic_id_mapping_explicitly_signalled_flag | u(1) |
|   if( sps_subpic_id_mapping_explicitly_signalled_flag ) { | |
|     sps_subpic_id_mapping_present_flag | u(1) |
|     if( sps_subpic_id_mapping_present_flag ) | |
|       for( i = 0; i <= sps_num_subpics_minus1; i++ ) | |
|         sps_subpic_id[ i ] | u(v) |
|     } | |
|   } | |
|   ... | ue(v) |

Labels: 1110, 1112, 1120, 1122, 1124, 1126, 1128, 1130, 1140, 1142, 1150, 1160, 1162

| pic_parameter_set_rbsp( ) { | Descriptor |
|---|---|
| ... | u(1) |
| 1210 — pps_no_pic_partition_flag | u(1) |
| 1220 — pps_subpic_id_mapping_present_flag | u(1) |
|   if( pps_subpic_id_mapping_present_flag ) { | |
|     if( !pps_no_pic_partition_flag ) | |
| 1222 —     pps_num_subpics_minus1 | ue(v) |
| 1224 —     pps_subpic_id_len_minus1 | ue(v) |
|     for( i = 0; i <= pps_num_subpic_minus1; i++ ) | |
| 1226 —       pps_subpic_id[ i ] | u(v) |
|   } | |
|   if( !pps_no_pic_partition_flag ) { | |
| 1228 —   pps_log2_ctu_size_minus5 | u(2) |
| 1232 —   pps_num_exp_tile_columns_minus1 | ue(v) |
| 1234 —   pps_num_exp_tile_rows_minus1 | ue(v) |
|   for( i = 0; i <= pps_num_exp_tile_columns_minus1; i++ ) | |
| 1236 —     pps_tile_column_width_minus1[ i ] | ue(v) |
|   for( i = 0; i <= pps_num_exp_tile_rows_minus1; i++ ) | |
| 1238 —     pps_tile_row_height_minus1[ i ] | ue(v) |
|   if( NumTilesInPic > 1 ) { | |
| 1230 —     pps_loop_filter_across_tiles_enabled_flag | u(1) |
| 1240 —     pps_rect_slice_flag | u(1) |
|   } | |
|   if( pps_rect_slice_flag ) | |
| 1250 —   pps_single_slice_per_subpic_flag | u(1) |
|   if( pps_rect_slice_flag && !pps_single_slice_per_subpic_flag ) { | |
| 1252 —   pps_num_slices_in_pic_minus1 | ue(v) |
|   if( pps_num_slices_in_pic_minus1 > 1 ) | |
| 1260 —     pps_tile_idx_delta_present_flag | u(1) |
|   for( i = 0; i < pps_num_slices_in_pic_minus1; i++ ) { | |
|     if( SliceTopLeftTileIdx[ i ] % NumTileColumns != NumTileColumns − 1 ) | |
| 1262 —       pps_slice_width_in_tiles_minus1[ i ] | ue(v) |

FIG. 12

```
                                                                                                    1200
         ┌─────────────────────────────────────────────────────────────────────────────┬─────────┐
         │    if( SliceTopLeftTileIdx[ i ] / NumTileColumns != NumTileRows − 1 &&      │         │
         │        ( pps_tile_idx_delta_present_flag ||                                 │         │
         │          SliceTopLeftTileIdx[ i ] % NumTileColumns == 0 ) )                 │         │
  1264 ──┤      pps_slice_height_in_tiles_minus1[ i ]                                  │  ue(v)  │
         │    if( pps_slice_width_in_tiles_minus1[ i ] == 0 &&                         │         │
         │        pps_slice_height_in_tiles_minus1[ i ] == 0 &&                        │         │
         │        RowHeight( SliceTopLeftTileIdx[ i ] / NumTileColumns ) > 1 ) {       │         │
  1266 ──┤      pps_num_exp_slices_in_tile[ i ]                                        │  ue(v)  │
         │      for( j = 0; j < pps_num_exp_slices_in_tile[ i ]; j++ )                 │         │
  1268 ──┤        pps_exp_slice_height_in_ctus_minus1[ i ][ j ]                        │  ue(v)  │
         │      i += NumSlicesInTile[ i ] − 1                                          │         │
         │    }                                                                        │         │
         │    if( pps_tile_idx_delta_present_flag && i < pps_num_slices_in_pic_minus1 )│         │
  1272 ──┤      pps_tile_idx_delta_val[ i ]                                            │  se(v)  │
         │  }                                                                          │         │
         │ }                                                                           │         │
         │ if( !pps_rect_slice_flag || pps_single_slice_per_subpic_flag ||             │         │
         │     pps_num_slices_in_pic_minus1 > 0 )                                      │         │
  1270 ──┤   pps_loop_filter_across_slices_enabled_flag                                │  u(1)   │
         │ }                                                                           │         │
         │ ...                                                                         │  u(1)   │
         └─────────────────────────────────────────────────────────────────────────────┴─────────┘
```

FIG. 12 (continued)

```
for( i = 0; i <= sps_num_subpics_minus1; i++ )
   if( sps_subpic_id_mapping_explicitly_signalled_flag )
      SubpicIdVal[ i ] = pps_subpic_id_mapping_present_flag ? pps_subpic_id[ i ] : sps_subpic_id[ i ]
(81)
   else
      SubpicIdVal[ i ] = i
```

FIG. 13

```
remainingWidthInCtbsY = PicWidthInCtbsY
for( i = 0; i <= pps_num_exp_tile_columns_minus1; i++ ) {
   colWidth[ i ] = pps_tile_column_width_minus1[ i ] + 1
   remainingWidthInCtbsY -= colWidth[ i ]
}
uniformTileColWidth = pps_tile_column_width_minus1[ pps_num_exp_tile_columns_minus1 ] + 1
while( remainingWidthInCtbsY >= uniformTileColWidth ) {
   colWidth[ i++ ] = uniformTileColWidth
   remainingWidthInCtbsY -= uniformTileColWidth
}
if( remainingWidthInCtbsY > 0 )
   colWidth[ i++ ] = remainingWidthInCtbsY
NumTileColumns = i
```

FIG. 14

```
remainingHeightInCtbsY = PicHeightInCtbsY
for( j = 0; j <= pps_num_exp_tile_rows_minus1; j++ ) {
   RowHeight[ j ] = pps_tile_row_height_minus1[ j ] + 1
   remainingHeightInCtbsY -= RowHeight[ j ]
}
uniformTileRowHeight = pps_tile_row_height_minus1[ pps_num_exp_tile_rows_minus1 ] + 1
while( remainingHeightInCtbsY >= uniformTileRowHeight ) {
   RowHeight[ j++ ] = uniformTileRowHeight
   remainingHeightInCtbsY -= uniformTileRowHeight
}
if( remainingHeightInCtbsY > 0 )
   RowHeight[ j++ ] = remainingHeightInCtbsY
NumTileRows = j
```

FIG. 15

```
for( tileColBd[ 0 ] = 0, i = 0; i < NumTileColumns; i++ )
    tileColBd[ i + 1 ] = tileColBd[ i ] + colWidth[ i ]
```

FIG. 16

```
for( tileRowBd[ 0 ] = 0, j = 0; j < NumTileRows; j++ )
    tileRowBd[ j + 1 ] = tileRowBd[ j ] + RowHeight[ j ]
```

FIG. 17

```
tileX = 0
for( ctbAddrX = 0; ctbAddrX <= PicWidthInCtbsY; ctbAddrX++ ) {
    if( ctbAddrX = = tileColBd[ tileX + 1 ] )
        tileX++
    CtbToTileColBd[ ctbAddrX ] = tileColBd[ tileX ]
    ctbToTileColIdx[ ctbAddrX ] = tileX
}
```

FIG. 18

```
tileY = 0
for( ctbAddrY = 0; ctbAddrY <= PicHeightInCtbsY; ctbAddrY++ ) {
    if( ctbAddrY = = tileRowBd[ tileY + 1 ] )
        tileY++
    CtbToTileRowBd[ ctbAddrY ] = tileRowBd[ tileY ]
    ctbToTileRowIdx[ ctbAddrY ] = tileY
}
```

FIG. 19

```
for( i = 0; i <= sps_num_subpics_minus1; i++ ) {
   leftX = sps_subpic_ctu_top_left_x[ i ]
   rightX = leftX + sps_subpic_width_minus1[ i ]
   SubpicWidthInTiles[ i ] = ctbToTileColIdx[ rightX ] + 1 − ctbToTileColIdx[ leftX ]
   topY = sps_subpic_ctu_top_left_y[ i ]
   bottomY = topY + sps_subpic_height_minus1[ i ]
   SubpicHeightInTiles[ i ] = ctbToTileRowIdx[ bottomY ] + 1 − ctbToTileRowIdx[ topY ]
   if( SubpicHeightInTiles[ i ] == 1  &&
       sps_subpic_height_minus1[ i ] + 1 < RowHeight[ ctbToTileRowIdx[ topY ] ] )
      subpicHeightLessThanOneTileFlag[ i ] = 1
   else
      subpicHeightLessThanOneTileFlag[ i ] = 0
}
```

FIG. 20

```
if( pps_single_slice_per_subpic_flag ) {
    if( !sps_subpic_info_present_flag ) /* There is no subpicture info and only one slice in a picture. */
        for( j = 0; j < NumTileRows; j++ )
            for( i = 0; i < NumTileColumns; i++ )
                AddCtbsToSlice( 0, tileColBd[ i ], tileColBd[ i + 1 ], tileRowBd[ j ],
tileRowBd[ j + 1 ] )
    else {
        for( i = 0; i <= sps_num_subpics_minus1; i++ ) {
            NumCtusInSlice[ i ] = 0
            if( subpicHeightLessThanOneTileFlag[ i ] ) /* The slice consists of a set of CTU rows in
a tile. */
                AddCtbsToSlice( i, sps_subpic_ctu_top_left_x[ i ],
                        sps_subpic_ctu_top_left_x[ i ] + sps_subpic_width_minus1[ i ] + 1,
                        sps_subpic_ctu_top_left_y[ i ],
                        sps_subpic_ctu_top_left_y[ i ] + sps_subpic_height_minus1[ i ] + 1 )
            else { /* The slice consists of a number of complete tiles covering a rectangular
region. */
                tileX = CtbToTileColBd[ sps_subpic_ctu_top_left_x[ i ] ]
                tileY = CtbToTileRowBd[ sps_subpic_ctu_top_left_y[ i ] ]
                for( j = 0; j < SubpicHeightInTiles[ i ]; j++ )
                    for( k = 0; k < SubpicWidthInTiles[ i ]; k++ )
                        AddCtbsToSlice( i, tileColBd[ tileX + k ],
tileColBd[ tileX + k + 1 ],
                                                                                tileRowBd[ tileY + j ],
tileRowBd[ tileY + j + 1 ] )
            }
        }
    }
} else {
    tileIdx = 0
    for( i = 0; i <= pps_num_slices_in_pic_minus1; i++ )
        NumCtusInSlice[ i ] = 0
    for( i = 0; i <= pps_num_slices_in_pic_minus1; i++ ) {
        SliceTopLeftTileIdx[ i ] = tileIdx
        tileX = tileIdx % NumTileColumns
        tileY = tileIdx / NumTileColumns
        if( i < pps_num_slices_in_pic_minus1 ) {
            sliceWidthInTiles[ i ] = pps_slice_width_in_tiles_minus1[ i ] + 1
            sliceHeightInTiles[ i ] = pps_slice_height_in_tiles_minus1[ i ] + 1
        } else {
            sliceWidthInTiles[ i ] = NumTileColumns - tileX
            sliceHeightInTiles[ i ] = NumTileRows - tileY
            NumSlicesInTile[ i ] = 1
        }
```

FIG. 21

```
for( j = 0; j < pps_num_exp_slices_in_tile[ i ]; j++ ) {
    sliceHeightInCtus[ i + j ] = pps_exp_slice_height_in_ctus_minus1[ i ][ j ] + 1
    remainingHeightInCtbsY -= sliceHeightInCtus[ i + j ]
}
uniformSliceHeight = sliceHeightInCtus[ i + j - 1 ]
while( remainingHeightInCtbsY >= uniformSliceHeight ) {
    sliceHeightInCtus[ i + j ] = uniformSliceHeight
    remainingHeightInCtbsY -= uniformSliceHeight
    j++
}
if( remainingHeightInCtbsY > 0 ) {
    sliceHeightInCtus[ i + j ] = remainingHeightInCtbsY
    j++
}
NumSlicesInTile[ i ] = j
}
ctbY = tileRowBd[ tileY ]
for( j = 0; j < NumSlicesInTile[ i ]; j++ ) {
    AddCtbsToSlice( i + j, tileColBd[ tileX ], tileColBd[ tileX + 1 ],
        ctbY, ctbY + sliceHeightInCtus[ i + j ] )
    ctbY += sliceHeightInCtus[ i + j ]
}
i += NumSlicesInTile[ i ] - 1
} else
    for( j = 0; j < sliceHeightInTiles[ i ]; j++ )
        for( k = 0; k < sliceWidthInTiles[ i ]; k++ )
            AddCtbsToSlice( i, tileColBd[ tileX + k ], tileColBd[ tileX + k + 1 ],
                tileRowBd[ tileY + j ], tileRowBd[ tileY + j + 1 ] )
if( i < pps_num_slices_in_pic_minus1 ) {
    if( pps_tile_idx_delta_present_flag )
        tileIdx += pps_tile_idx_delta_val[ i ]
    else {
        tileIdx += sliceWidthInTiles[ i ]
        if( tileIdx % NumTileColumns == 0 )
            tileIdx += ( sliceHeightInTiles[ i ] - 1 ) * NumTileColumns
    }
}
}
}
}
```

FIG. 21 (continued)

```
for( ctbY = startY; ctbY < stopY; ctbY++ )
    for( ctbX = startX; ctbX < stopX; ctbX++ ) {
        CtbAddrInSlice[ sliceIdx ][ NumCtusInSlice[ sliceIdx ] ] = ctbY * PicWidthInCtbsY + ctbX
        NumCtusInSlice[ sliceIdx ]++
    }
```

FIG. 22

```
for( i = 0; i <= sps_num_subpics_minus1; i++ ) {
    NumSlicesInSubpic[ i ] = 0
    for( j = 0; j <= pps_num_slices_in_pic_minus1; j++ ) {
        posX = CtbAddrInSlice[ j ][ 0 ] % PicWidthInCtbsY
        posY = CtbAddrInSlice[ j ][ 0 ] / PicWidthInCtbsY
        if( ( posX >= sps_subpic_ctu_top_left_x[ i ] ) &&
            ( posX < sps_subpic_ctu_top_left_x[ i ] + sps_subpic_width_minus1[ i ] + 1 ) &&
            ( posY >= sps_subpic_ctu_top_left_y[ i ] ) &&
            ( posY < sps_subpic_ctu_top_left_y[ i ] + sps_subpic_height_minus1[ i ] + 1 ) ) {
            SubpicIdxForSlice[ j ] = i
            SubpicLevelSliceIdx[ j ] = NumSlicesInSubpic[ i ]
            NumSlicesInSubpic[ i ]++
        }
    }
}
```

| seq_parameter_set_rbsp() { | Descriptor |
|---|---|
| ... | u(2) |
|   sps_no_pic_partition_flag | u(1) |
|   sps_subpic_info_present_flag | u(1) |
|   if( sps_subpic_info_present_flag ) { | |
|     sps_num_subpics_minus1 | ue(v) |
|     if( sps_num_subpics_minus1 > 0 ) | |
|     sps_independent_subpics_flag | u(1) |
|     for( i = 0; sps_num_subpics_minus1 > 0 && i <= sps_num_subpics_minus1; i++ ) { | |
|       if( i > 0 && sps_pic_width_max_in_luma_samples > CtbSizeY ) | |
|       sps_subpic_ctu_top_left_x[ i ] | u(v) |
|       if( i > 0 && sps_pic_height_max_in_luma_samples > CtbSizeY ) { | |
|       sps_subpic_ctu_top_left_y[ i ] | u(v) |
|       if( i < sps_num_subpics_minus1 &&         sps_pic_width_max_in_luma_samples > CtbSizeY ) | |
|       sps_subpic_width_minus1[ i ] | u(v) |
|       if( i < sps_num_subpics_minus1 &&         sps_pic_height_max_in_luma_samples > CtbSizeY ) | |
|       sps_subpic_height_minus1[ i ] | u(v) |
|       if( !sps_independent_subpics_flag) { | |
|       sps_subpic_treated_as_pic_flag[ i ] | u(1) |
|       sps_loop_filter_across_subpic_enabled_flag[ i ] | u(1) |
|       } | |
|     } | |
|   ... | ue(v) |

FIG. 24

| seq_parameter_set_rbsp( ) { | Descriptor |
|---|---|
| ... | u(2) |
|   sps_no_pic_partition_flag | u(1) |
|   if(!sps_no_pic_partition_flag) | |
|     sps_subpic_info_present_flag | u(1) |
|   if( sps_subpic_info_present_flag ) { | |
|     sps_num_subpics_minus1 | ue(v) |
|     if( sps_num_subpics_minus1 > 0 ) | |
|       sps_independent_subpics_flag | u(1) |
|     for( i = 0; sps_num_subpics_minus1 > 0 && i <= sps_num_subpics_minus1; i++ ) { | |
|       if( i > 0 && sps_pic_width_max_in_luma_samples > CtbSizeY ) | |
|         sps_subpic_ctu_top_left_x[ i ] | u(v) |
|       if( i > 0 && sps_pic_height_max_in_luma_samples > CtbSizeY ) { | |
|         sps_subpic_ctu_top_left_y[ i ] | u(v) |
|       if( i < sps_num_subpics_minus1 &&          sps_pic_width_max_in_luma_samples > CtbSizeY ) | |
|         sps_subpic_width_minus1[ i ] | u(v) |
|       if( i < sps_num_subpics_minus1 &&          sps_pic_height_max_in_luma_samples > CtbSizeY ) | |
|         sps_subpic_height_minus1[ i ] | u(v) |
|       if( !sps_independent_subpics_flag) { | |
|         sps_subpic_treated_as_pic_flag[ i ] | u(1) |
|         sps_loop_filter_across_subpic_enabled_flag[ i ] | u(1) |
|       } | |
|     } | |
| ... | ue(v) |

FIG. 25

| seq_parameter_set_rbsp( ) { | Descriptor |
|---|---|
| ... | u(2) |
| sps_no_pic_partition_flag | u(1) |
| sps_subpic_info_present_flag | u(1) |
|   if( sps_subpic_info_present_flag ) { | |
|     if(!sps_no_pic_partition_flag) | |
|       sps_num_subpics_minus1 | ue(v) |
|     if( sps_num_subpics_minus1 > 0 ) | |
|       sps_independent_subpics_flag | u(1) |
|     for( i = 0; sps_num_subpics_minus1 > 0 && i <= sps_num_subpics_minus1; i++ ) { | |
|       if( i > 0 && sps_pic_width_max_in_luma_samples > CtbSizeY ) | |
|         sps_subpic_ctu_top_left_x[ i ] | u(v) |
|       if( i > 0 && sps_pic_height_max_in_luma_samples > CtbSizeY ) { | |
|         sps_subpic_ctu_top_left_y[ i ] | u(v) |
|       if( i < sps_num_subpics_minus1 && sps_pic_width_max_in_luma_samples > CtbSizeY ) | |
|         sps_subpic_width_minus1[ i ] | u(v) |
|       if( i < sps_num_subpics_minus1 && sps_pic_height_max_in_luma_samples > CtbSizeY ) | |
|         sps_subpic_height_minus1[ i ] | u(v) |
|       if( !sps_independent_subpics_flag) { | |
|         sps_subpic_treated_as_pic_flag[ i ] | u(1) |
|         sps_loop_filter_across_subpic_enabled_flag[ i ] | u(1) |
|       } | |
|     } | |
| ... | ue(v) |

FIG. 26

| pic_parameter_set_rbsp( ) { | Descriptor |
|---|---|
| ... | u(1) |
| pps_no_pic_partition_flag | u(1) |
| ... | u(1) |
| if( !pps_no_pic_partition_flag ) { | |
|   pps_log2_ctu_size_minus5 | u(2) |
|   pps_num_exp_tile_columns_minus1 | ue(v) |
|   pps_num_exp_tile_rows_minus1 | ue(v) |
|   for( i = 0; i <= pps_num_exp_tile_columns_minus1; i++ ) | |
|     pps_tile_column_width_minus1[ i ] | ue(v) |
|   for( i = 0; i <= pps_num_exp_tile_rows_minus1; i++ ) | |
|     pps_tile_row_height_minus1[ i ] | ue(v) |
|   if( NumTilesInPic > 1 ) { | |
|     pps_loop_filter_across_tiles_enabled_flag | u(1) |
|   } | |
|   if( NumTilesInPic > 3 ){ | |
|     pps_rect_slice_flag | u(1) |
|   } | |
|   ... | |
| ... | u(1) |

FIG. 28

| | | 3000 |
|---|---|---|
| pic_parameter_set_rbsp() { | | Descriptor |
| ... | | u(1) |
|   if( pps_rect_slice_flag ) | | |
| 1250 →    pps_single_slice_per_subpic_flag | | u(1) |
|   if( pps_rect_slice_flag && !pps_single_slice_per_subpic_flag ) { | | |
| 1252 →    pps_num_slices_in_pic_minus1 | | ue(v) |
|     if( pps_num_slices_in_pic_minus1 > 1 ) | | |
| 1260 →      pps_tile_idx_delta_present_flag | | u(1) |
|     for( i = 0; i < pps_num_slices_in_pic_minus1; i++ ) { | | |
|       if( SliceTopLeftTileIdx[ i ] % NumTileColumns != NumTileColumns − 1 ) | | |
| 1262 →        pps_slice_width_in_tiles_minus1[ i ] | | ue(v) |
|       if( SliceTopLeftTileIdx[ i ] / NumTileColumns != NumTileRows − 1 && <br>         ( pps_tile_idx_delta_present_flag || <br>         SliceTopLeftTileIdx[ i ] % NumTileColumns == 0 ) ) | | |
| 1264 →        pps_slice_height_in_tiles_minus1[ i ] | | ue(v) |
|       if( pps_slice_width_in_tiles_minus1[ i ] == 0 && <br>         pps_slice_height_in_tiles_minus1[ i ] == 0 && <br>         RowHeight[ SliceTopLeftTileIdx[ i ] / NumTileColumns ] > 1 ) { | | |
| 3066 →        ~~pps_num_slices_in_tile~~ pps_num_exp_slices_in_tile_minus1[ i ] | | ue(v) |
|         for( j = 0; j ~~< pps_num_exp_slices_in_tile[ i ]~~ <br>         <=pps_num_exp_slices_in_tile_minus1[ i ]; j++ ) | | |
| 1268 →          pps_exp_slice_height_in_ctus_minus1[ i ][ j ] | | ue(v) |
|         i += NumSlicesInTile[ i ] − 1 | | |
|       } | | |
|       if( pps_tile_idx_delta_present_flag && i < pps_num_slices_in_pic_minus1 ) | | |
| 1272 →        pps_tile_idx_delta_val[ i ] | | se(v) |
|     } | | |
|   } | | |
|   if( !pps_rect_slice_flag || pps_single_slice_per_subpic_flag || <br>     pps_num_slices_in_pic_minus1 > 0 ) | | |
|     pps_loop_filter_across_slices_enabled_flag | | u(1) |
| 1270 →  } | | |
| ... | | u(1) |

FIG. 30

```
if( sliceWidthInTiles[ i ] == 1 && sliceHeightInTiles[ i ] == 1 ) {
    if( pps_num_exp_slices_in_tile[ i ] == 0 ) {
        NumSlicesInTile[ i ] = 1
        sliceHeightInCtus[ i ] = RowHeight[ SliceTopLeftTileIdx[ i ] / NumTileColumns ]
    } else {
        remainingHeightInCtbsY = RowHeight[ SliceTopLeftTileIdx[ i ] / NumTileColumns ]
        for( j = 0; j < =pps_num_exp_slices_in_tile minus1[ i ]; j++ ) {
            sliceHeightInCtus[ i + j ] = pps_exp_slice_height_in_ctus_minus1[ i ][ j ] + 1
            remainingHeightInCtbsY -= sliceHeightInCtus[ i + j ]
        }
        uniformSliceHeight = sliceHeightInCtus[ i + j − 1 ]
        while( remainingHeightInCtbsY >= uniformSliceHeight ) {
            sliceHeightInCtus[ i + j ] = uniformSliceHeight
            remainingHeightInCtbsY -= uniformSliceHeight
            j++
        }
        if( remainingHeightInCtbsY > 0 ) {
            sliceHeightInCtus[ i + j ] = remainingHeightInCtbsY
            j++
        }
        NumSlicesInTile[ i ] = j
    }
}
```

FIG. 33

```
if( pps_single_slice_per_subpic_flag ) {
    if( !sps_subpic_info_present_flag ) /* There is no subpicture info and only one slice in a picture. */
        for( j = 0; j < NumTileRows; j++ )
            for( i = 0; i < NumTileColumns; i++ )
                AddCtbsToSlice( 0, tileColBd[ i ], tileColBd[ i + 1 ], tileRowBd[ j ], tileRowBd[ j + 1 ] )
    else {
        for( i = 0; i <= sps_num_subpics_minus1; i++ ) {
            NumCtusInSlice[ i ] = 0
            if( subpicHeightLessThanOneTileFlag[ i ] ) /* The slice consists of a set of CTU rows in a tile. */
                AddCtbsToSlice( i, sps_subpic_ctu_top_left_x[ i ], sps_subpic_ctu_top_left_x[ i ] + sps_subpic_width_minus1[ i ] + 1,
                    sps_subpic_ctu_top_left_y[ i ], sps_subpic_ctu_top_left_y[ i ] + sps_subpic_height_minus1[ i ] + 1 )
            else { /* The slice consists of a number of complete tiles covering a rectangular region. */
                tileX = ~~CtbToTileColBd~~ctbToTileColBdIdx[ sps_subpic_ctu_top_left_x[ i ] ]
                tileY = ~~CtbToTileRowBd~~ctbToTileRowBdIdx[ sps_subpic_ctu_top_left_y[ i ] ]
                for( j = 0; j < SubpicHeightInTiles[ i ]; j++ )
                    for( k = 0; k < SubpicWidthInTiles[ i ]; k++ )
                        AddCtbsToSlice( i, tileColBd[ tileX + k ], tileColBd[ tileX + k + 1 ],
                            tileRowBd[ tileY + j ], tileRowBd[ tileY + j + 1 ] )
            }
        }
    }
} else {
    tileIdx = 0
    for( i = 0; i <= pps_num_slices_in_pic_minus1; i++ )
        NumCtusInSlice[ i ] = 0
    for( i = 0; i <= pps_num_slices_in_pic_minus1; i++ ) {
        SliceTopLeftTileIdx[ i ] = tileIdx
        tileX = tileIdx % NumTileColumns
        tileY = tileIdx / NumTileColumns
```

FIG. 34

```
        if( i < pps_num_slices_in_pic_minus1 ) {
            sliceWidthInTiles[ i ] = pps_slice_width_in_tiles_minus1[ i ] + 1
            sliceHeightInTiles[ i ] = pps_slice_height_in_tiles_minus1[ i ] + 1
        } else {
            sliceWidthInTiles[ i ] = NumTileColumns - tileX
            sliceHeightInTiles[ i ] = NumTileRows - tileY
            NumSlicesInTile[ i ] = 1
        }
        if( sliceWidthInTiles[ i ] = = 1 && sliceHeightInTiles[ i ] = = 1 ){
            if( pps_num_exp_slices_in_tile[ i ] = = 0 ) {
                NumSlicesInTile[ i ] = 1
                sliceHeightInCtus[ i ] =
RowHeight[ SliceTopLeftTileIdx[ i ] / NumTileColumns ]
            } else {
                remainingHeightInCtbsY =
RowHeight[ SliceTopLeftTileIdx[ i ] / NumTileColumns ]
                for( j = 0; j < pps_num_exp_slices_in_tile[ i ]; j++ ) {
                    sliceHeightInCtus[ i + j ] = pps_exp_slice_height_in_ctus_minus1[ i ][ j ] + 1
                    remainingHeightInCtbsY -= sliceHeightInCtus[ i + j ]
                }
                uniformSliceHeight = sliceHeightInCtus[ i + j - 1 ]
                while( remainingHeightInCtbsY >= uniformSliceHeight ) {
                    sliceHeightInCtus[ i + j ] = uniformSliceHeight
                    remainingHeightInCtbsY -= uniformSliceHeight
                    j++
                }
                if( remainingHeightInCtbsY > 0 ) {
                    sliceHeightInCtus[ i + j ] = remainingHeightInCtbsY
                    j++
                }
                NumSlicesInTile[ i ] = j
            }
            ctbY = tileRowBd[ tileY ]
            for( j = 0; j < NumSlicesInTile[ i ]; j++ ) {
```

FIG. 34 (continued)

```
                AddCtbsToSlice( i + j, tileColBd[ tileX ], tileColBd[ tileX + 1 ],
                    ctbY, ctbY + sliceHeightInCtus[ i + j ] )
                ctbY += sliceHeightInCtus[ i + j ]
            }
            i += NumSlicesInTile[ i ] - 1
        } else
            for( j = 0; j < sliceHeightInTiles[ i ]; j++ )
                for( k = 0; k < sliceWidthInTiles[ i ]; k++ )
                    AddCtbsToSlice( i, tileColBd[ tileX + k ],
tileColBd[ tileX + k + 1 ],
                        tileRowBd[ tileY + j ], tileRowBd[ tileY + j + 1 ] )
        if( i < pps_num_slices_in_pic_minus1 ) {
            if( pps_tile_idx_delta_present_flag )
                tileIdx += pps_tile_idx_delta_val[ i ]
            else {
                tileIdx += sliceWidthInTiles[ i ]
                if( tileIdx % NumTileColumns == 0 )
                    tileIdx += ( sliceHeightInTiles[ i ] - 1 ) * NumTileColumns
            }
        }
    }
}
```

FIG. 34 (continued)

TILE AND SLICE PARTITIONING IN VIDEO PROCESSING

CROSS-REFERENCE TO RELATED APPLICATIONS

The present application is a continuation of Ser. No. 17/326,772 filed May 21, 2021, which claims priority to U.S. Provisional Application No. 63/028,111, filed on May 21, 2020, both of which are incorporated herein by reference in their entireties.

TECHNICAL FIELD

The present disclosure generally relates to video data processing, and more particularly, to picture partitioning.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for encoding or decoding video. The method includes encoding or decoding, in a plurality of picture parameter sets (PPS) associated with pictures of a coded layer video sequence (CLVS), corresponding first PPS flags indicating whether pictures are allowed to be partitioned into a plurality of tiles or slices. In a first PPS, a corresponding first PPS flag with a first value indicates a first picture of the CLVS is unpartitioned, and in a second PPS, another corresponding first PPS flag with a second value being different from the first value indicates that a second picture of the CLVS is allowed to be partitioned.

In some embodiments, a method for encoding or decoding video includes: determining whether a picture is partitioned into a plurality of tiles or slices; and in response to a determination that the picture is allowed to be partitioned into the plurality of tiles or slices, encoding or decoding, in a picture parameter set (PPS), a first flag associated with a slice mode being applied to the picture referring to the PPS, wherein: when a raster-scan slice mode is applied to partition the picture, encoding or decoding the first flag with a first value; or when a rectangular slice mode is applied to partition the picture, encoding or decoding the first flag with a second value different from the first value.

In some embodiments, a method for decoding video includes: encoding or decoding, in a picture parameter set (PPS) associated with at least one picture of a coded layer video sequence (CLVS), a first PPS flag indicating whether the associated picture is allowed to be partitioned into a plurality of tiles or slices, wherein the first PPS flag being equal to a first value indicates that the associated picture is unpartitioned, or the first PPS flag being equal to a second value different from the first value indicates that the associated picture is allowed to be partitioned; and when the first PPS flag is equal to the first value, skipping encoding or decoding, in the PPS, a second PPS flag indicating whether each subpicture of the associated picture comprises a single rectangular slice, and determining a value of the second PPS flag equal to a third value, wherein the second PPS flag equal to the third value indicates that each subpicture of the associated picture comprises a single rectangular slice.

Embodiments of the present disclosure provide an apparatus including a memory configured to store instructions; and one or more processors configured to execute the instructions to cause the apparatus to perform any of the methods above.

Embodiments of the present disclosure provide a non-transitory computer-readable storage medium. The non-transitory computer-readable storage medium stores a set of instructions that are executable by one or more processors of a device to cause the device to perform operations for any of the methods above.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 is a schematic diagram illustrating structures of a picture partitioned in a raster-scan slice mode, consistent with some embodiments of the disclosure.

FIG. 8 is a schematic diagram illustrating structures of a picture partitioned in a rectangular slice mode, consistent with some embodiments of the disclosure.

FIG. 11 illustrates an exemplary coding syntax table of a portion of SPS syntax structure, consistent with some embodiments of the disclosure.

FIG. 12 illustrates an exemplary coding syntax table of a portion of PPS syntax structure, consistent with some embodiments of the disclosure.

FIGS. 13-23 show exemplary pseudocodes, consistent with some embodiments of the disclosure.

FIG. 24 illustrates an exemplary coding syntax table of a portion of SPS syntax structure, consistent with some embodiments of the disclosure.

FIG. 25 illustrates another exemplary coding syntax table of a portion of SPS syntax structure, consistent with some embodiments of the disclosure.

FIG. 26 illustrates another exemplary coding syntax table of a portion of SPS syntax structure, consistent with some embodiments of the disclosure.

FIG. 28 shows an exemplary modified coding syntax table of a portion of PPS syntax structure, consistent with some embodiments of the disclosure.

FIG. 30 shows an exemplary modified coding syntax table of a portion of PPS syntax structure, consistent with some embodiments of the disclosure.

FIG. 33 and FIG. 34 show exemplary pseudocodes, consistent with some embodiments of the disclosure.

DETAILED DESCRIPTION

Figure 1:
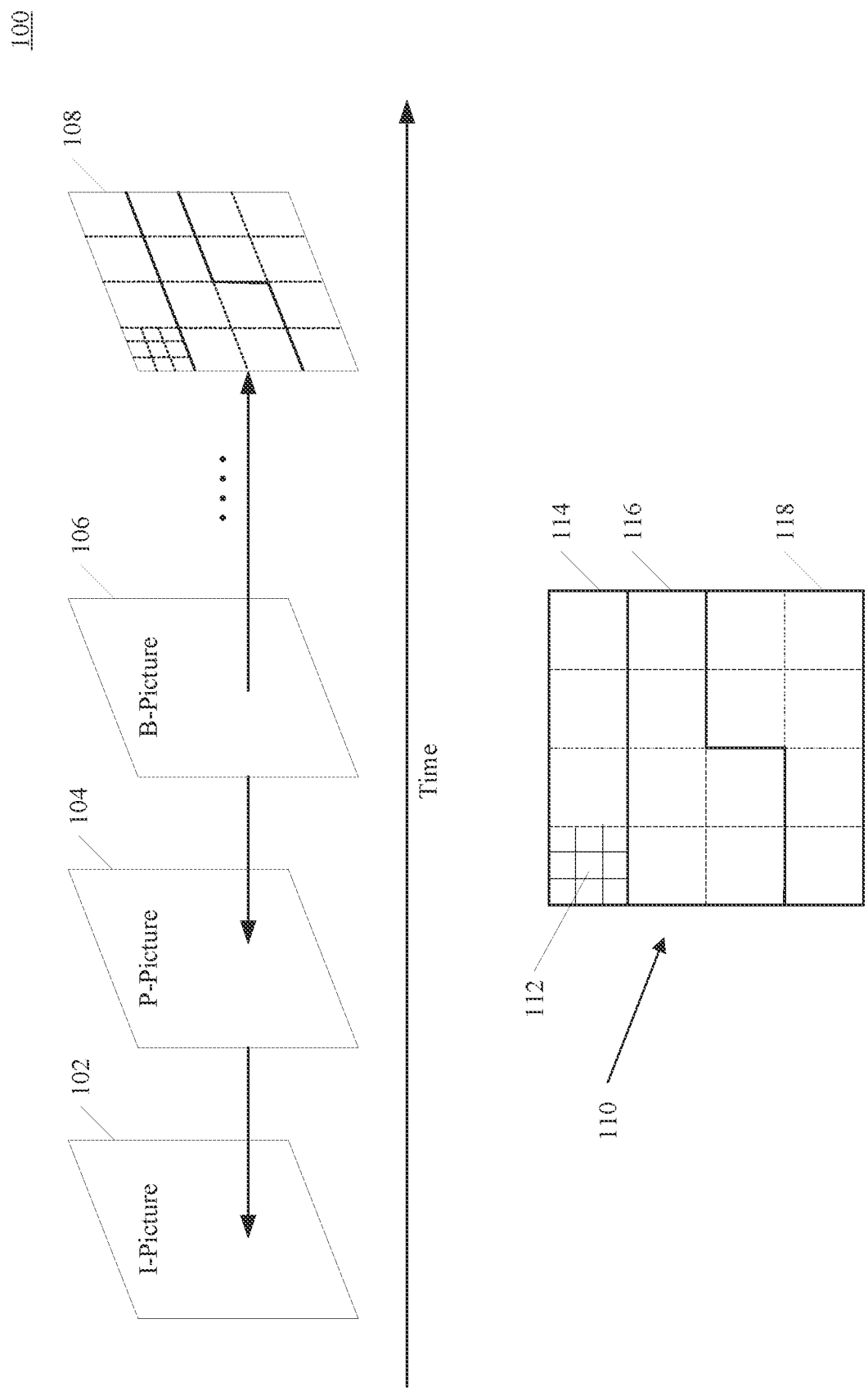
FIG. 1 is a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by one or more processors (e.g., one or more processors of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

In the present disclosure, SPS and PPS syntax elements related to tile/slice partitioning can be modified to remove unnecessary constraints or to determine values of the conditionally signaled syntax elements, which achieves a higher coding performance. By adopting these modifications, the consistency and efficiency of the encoding and decoding process for the video stream can be improved.

FIG. 1 illustrates structures of an example video sequence 100, according to some embodiments of the present disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
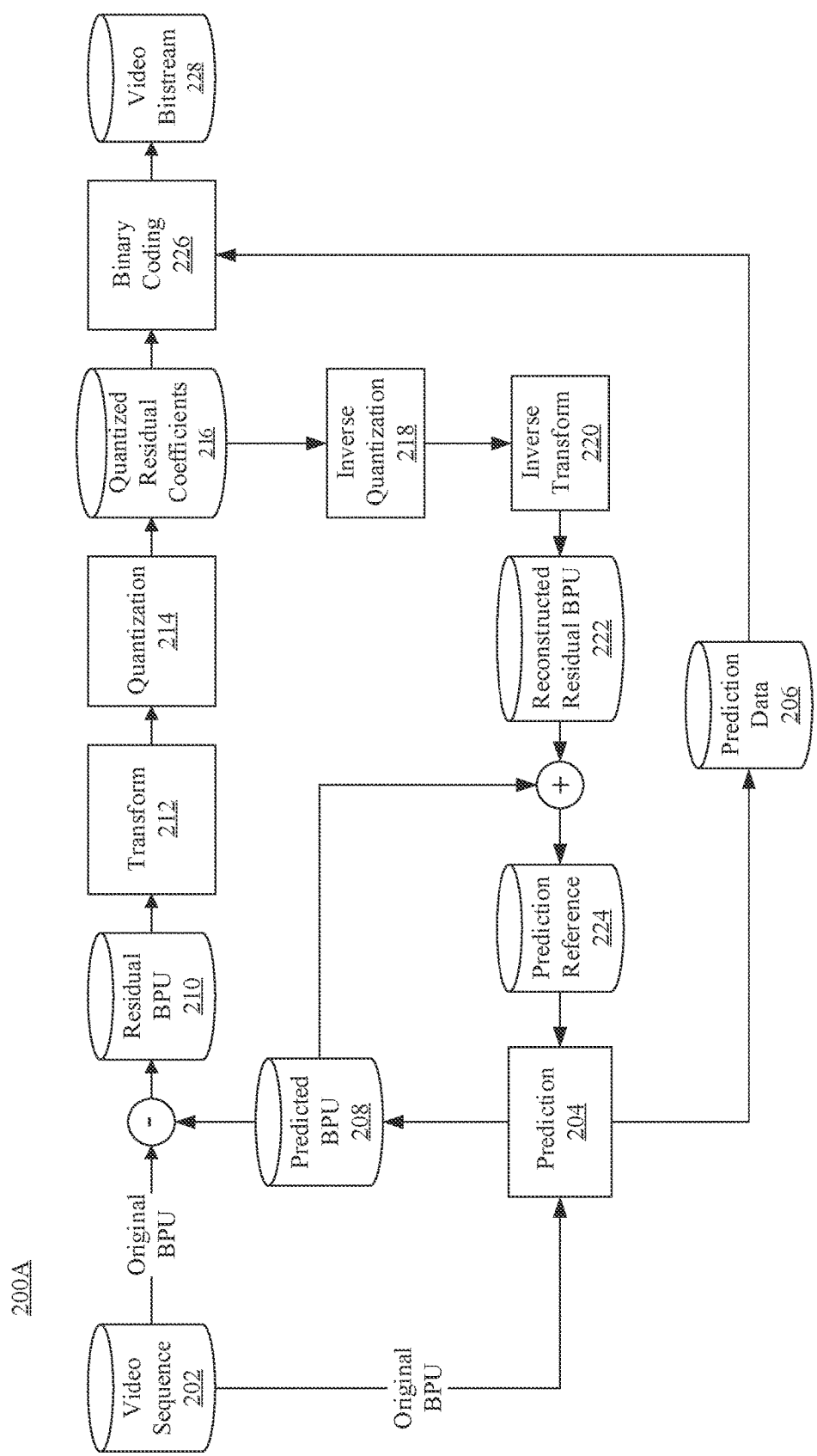
FIG. 2A is a schematic diagram illustrating an exemplary encoding process of a hybrid video coding system, consistent with embodiments of the disclosure.
Figure 2B:
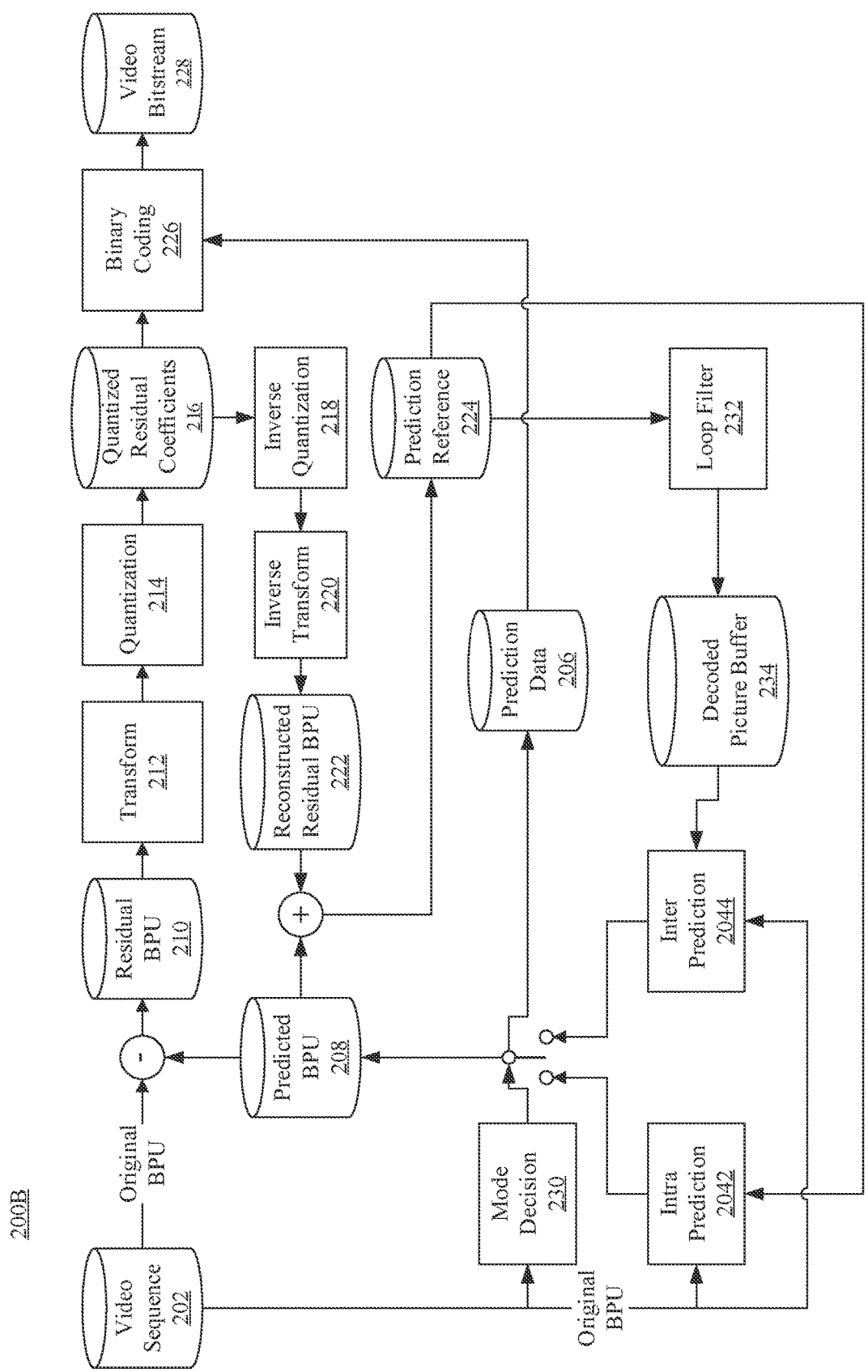
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/

VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate prediction reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and prediction data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets (SAOs), adaptive loop filters (ALFs), or the like. The loop-filtered reference picture can be stored in buffer 234 (or "decoded picture buffer (DPB)") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
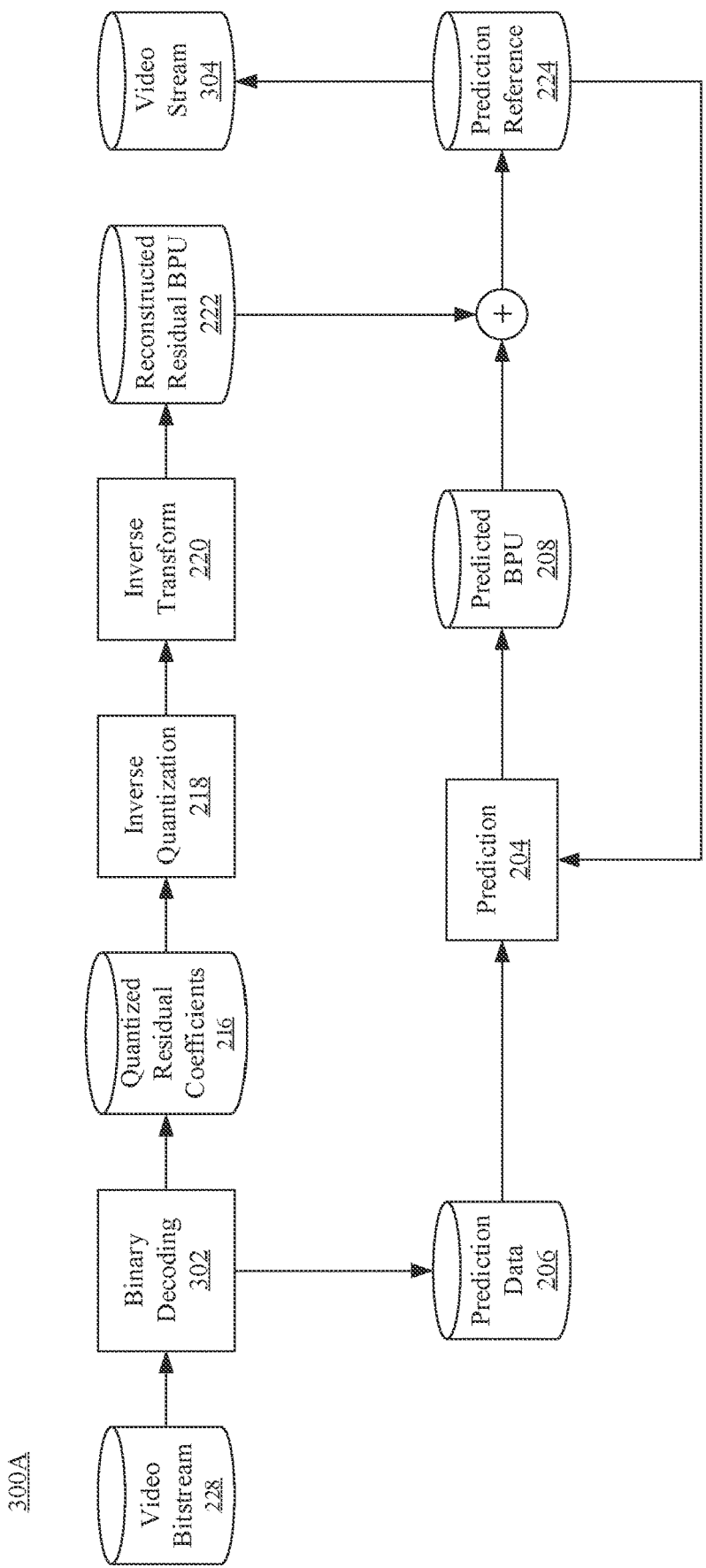
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs)

for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed prediction reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
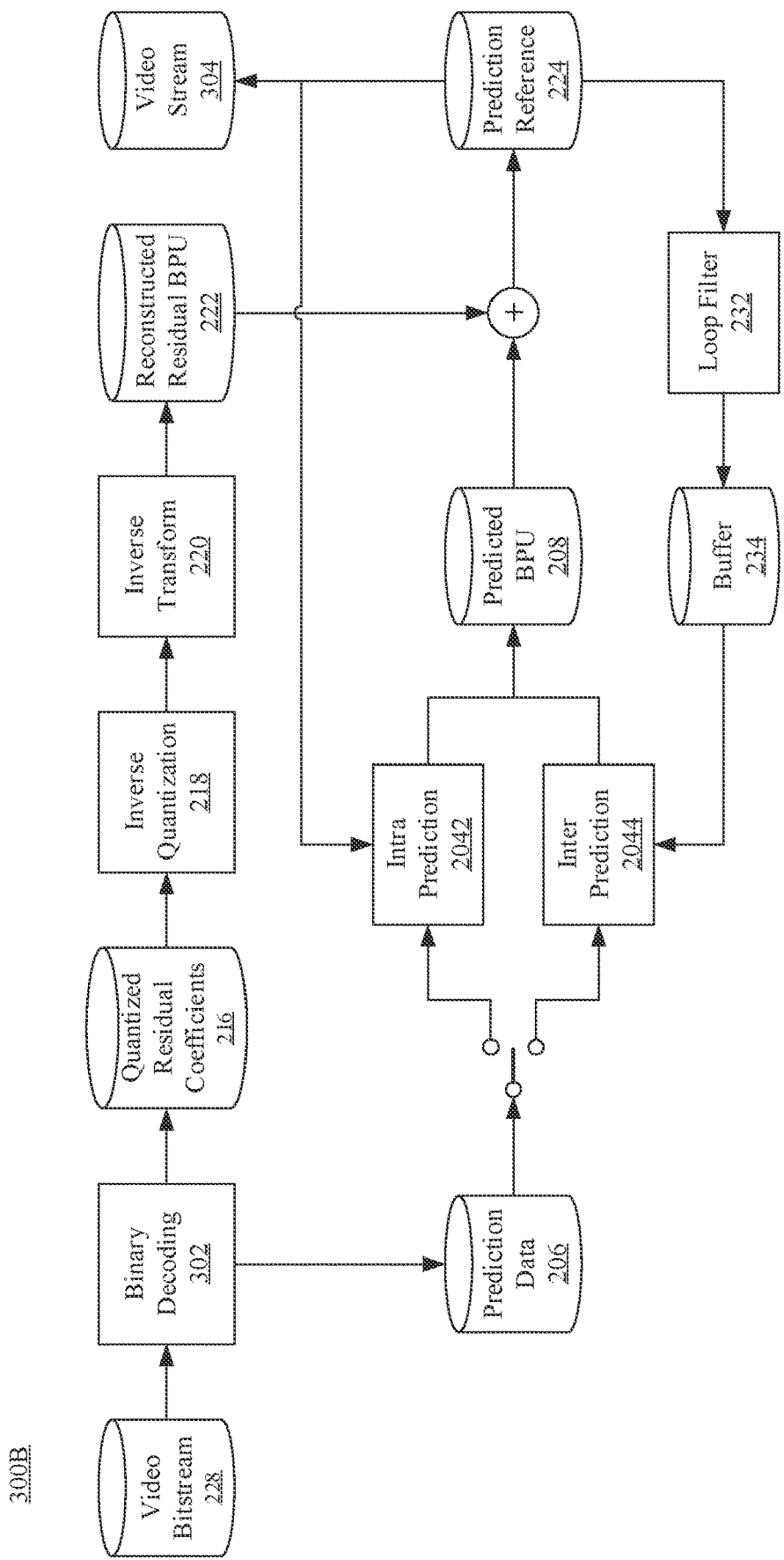
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer (DPB) in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU. Reconstructed pictures from buffer 234 can also be sent to a display, such as a TV, a PC, a smartphone, or a tablet to be viewed by end-users.

Figure 4:
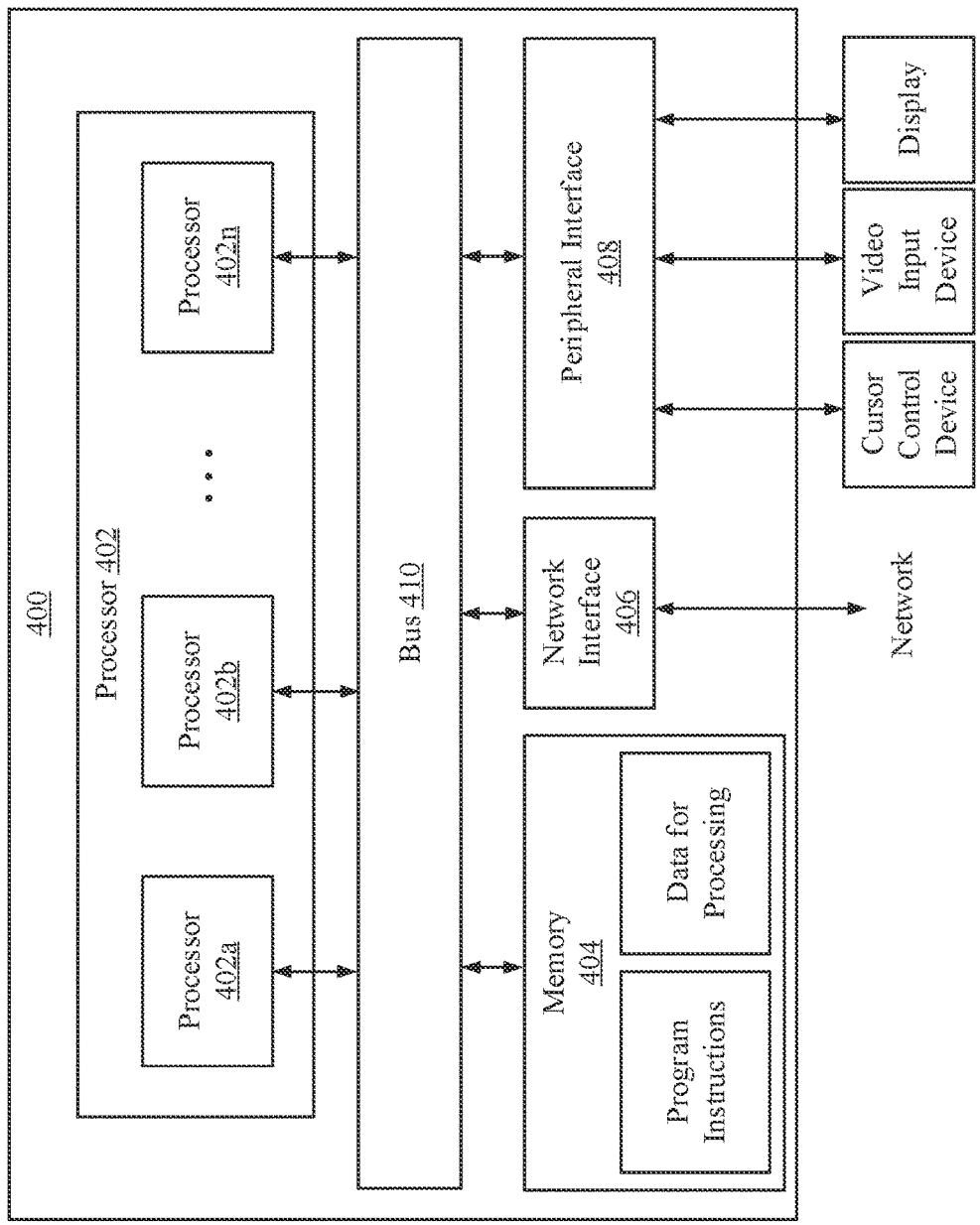
FIG. 4 is a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
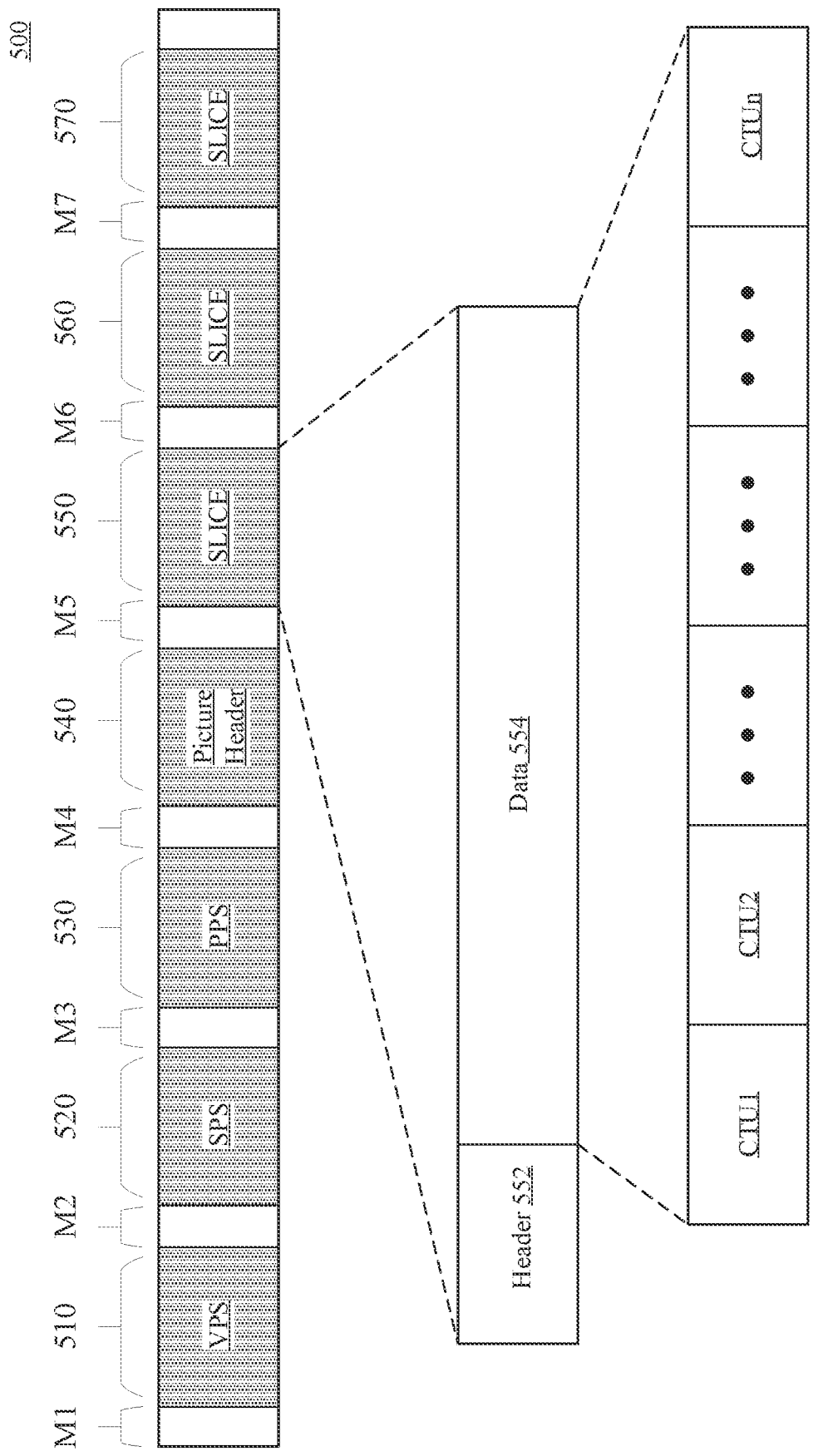
FIG. 5 is a schematic diagram of an exemplary bitstream, consistent with some embodiments of the present disclosure.

FIG. 5 is a schematic diagram of an example of a bitstream 500 encoded by the encoder, consistent with some embodiments of the present disclosure. In some embodiments, the structure of bitstream 500 can be applied for video bitstream 228 shown in FIGS. 2A-2B and FIGS. 3A-3B. In FIG. 5, bitstream 500 includes a Video Parameter Set (VPS) 510, a Sequence Parameter Set (SPS) 520, a Picture Parameter Set (PPS) 530, a Picture Header 540, Slices 550-570, which are separated by synchronization markers M1-M7. Slices 550-570 each include corresponding header blocks (e.g., header 552) and data blocks (e.g., data 554), each data block including one or more CTUs (e.g., CTU1-CTUn in data 554).

According to some embodiments, bitstream 500, which is a sequence of bits in form of network abstraction layer (NAL) unit or byte stream, forms one or more coded video sequences (CVS). A CVS includes one or more coded layer video sequences (CLVS). In some embodiments, a CLVS is a sequence of picture units (PUs) and each PU contains one coded picture. Particularly, a PU includes zero or one picture header NAL unit (e.g., Picture Header 540) which contains picture header syntax structure as payload, one coded picture which includes one or more video coding layer (VCL) NAL units, and, optionally, one or more other non-VCL NAL units. A VCL NAL unit is a collective term for coded slice NAL units (e.g., Slices 550-570) and the subset of NAL units that have reserved values of NAL unit type that are classified as VCL NAL units in some embodiments. A coded slice NAL unit contains a slice header and a slice data block (e.g., header 552 and data 554).

In other words, in some embodiments of the present disclosure, a layer can be a set of video coding layer (VCL) NAL units having a particular value of NAL layer ID and associated non-VCL NAL unit(s). Among these layers, inter-layer prediction may be applied between different layers to achieve high compression performance.

As explained above, in the Versatile Video Coding (e.g., VVC/H.266) standard, a picture can be partitioned into a set of CTUs, and multiple CTUs can form a tile, a slice, or a subpicture. When a picture includes three sample arrays for storing three color components (e.g., a luma component and two chroma components), a CTU can include N×N (N being an integer) blocks of luma samples, each block of luma sample being associated with two blocks of chroma samples. In some embodiments, an Output Layer Set (OLS) can be specified to support decoding some but not all the layers. The OLS is a set of layers including a specified set of layers where one or more layers in the set of layers are specified to be output layers. Therefore, an OLS can contain one or more output layers and other layers needed to decode the output layer(s) for inter-layer prediction.

Figure 6:
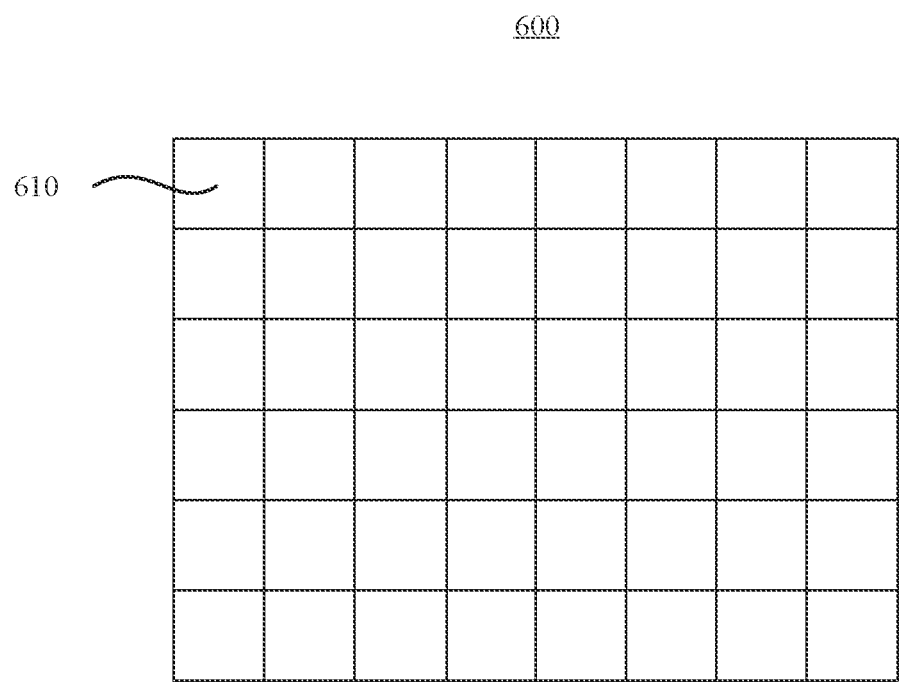
FIG. 6 is a schematic diagram illustrating structures of a picture partitioned into blocks, consistent with some embodiments of the disclosure.

By way of example, FIG. 6 is a schematic diagram illustrating structures of a picture 600 partitioned into blocks, consistent with some embodiments of the disclosure. In FIG. 6, each square represents a CTU 610, and picture 600 is partitioned into 8×6 CTUs 610. In some embodiments, the maximum allowed size of a luma block in a CTU is 128×128, while the maximum allowed size of a luma transform block is 64×64. In some embodiments, the minimum allowed size of a luma block in a CTU is 32×32. It should be noted that the maximum allowed size of the luma block, the maximum allowed size of the luma transform block, and the minimum allowed size of the luma block can be specified to be different values and different shapes in various video coding standards, and this disclosure does not limit them to the above-described examples.

Consistent with some embodiments of the disclosure, a picture can be partitioned into one or more tile rows and one or more tile columns. A "tile" in this disclosure can refer to a sequence of CTUs that covers a rectangular region of a picture. A "slice" in this disclosure can include an integer number of complete tiles, or include an integer number of consecutive, complete CTU rows that are within a tile of a picture.

In some embodiments, a picture can be partitioned into slices in two modes, a "raster-scan slice mode" and a "rectangular slice mode." In the raster-scan slice mode, a slice of a picture can include a sequence of complete tiles in a raster-scan order of the picture. In the rectangular slice mode, a slice of a picture can include a number of complete tiles that collectively form a rectangular region of the picture, or include a number of consecutive, complete CTU rows of a tile that collectively form a rectangular region of the picture. Tiles within a rectangular slice can be scanned in the raster-scan order within the formed rectangular region corresponding to the rectangular slice.

Figures 7, 8:
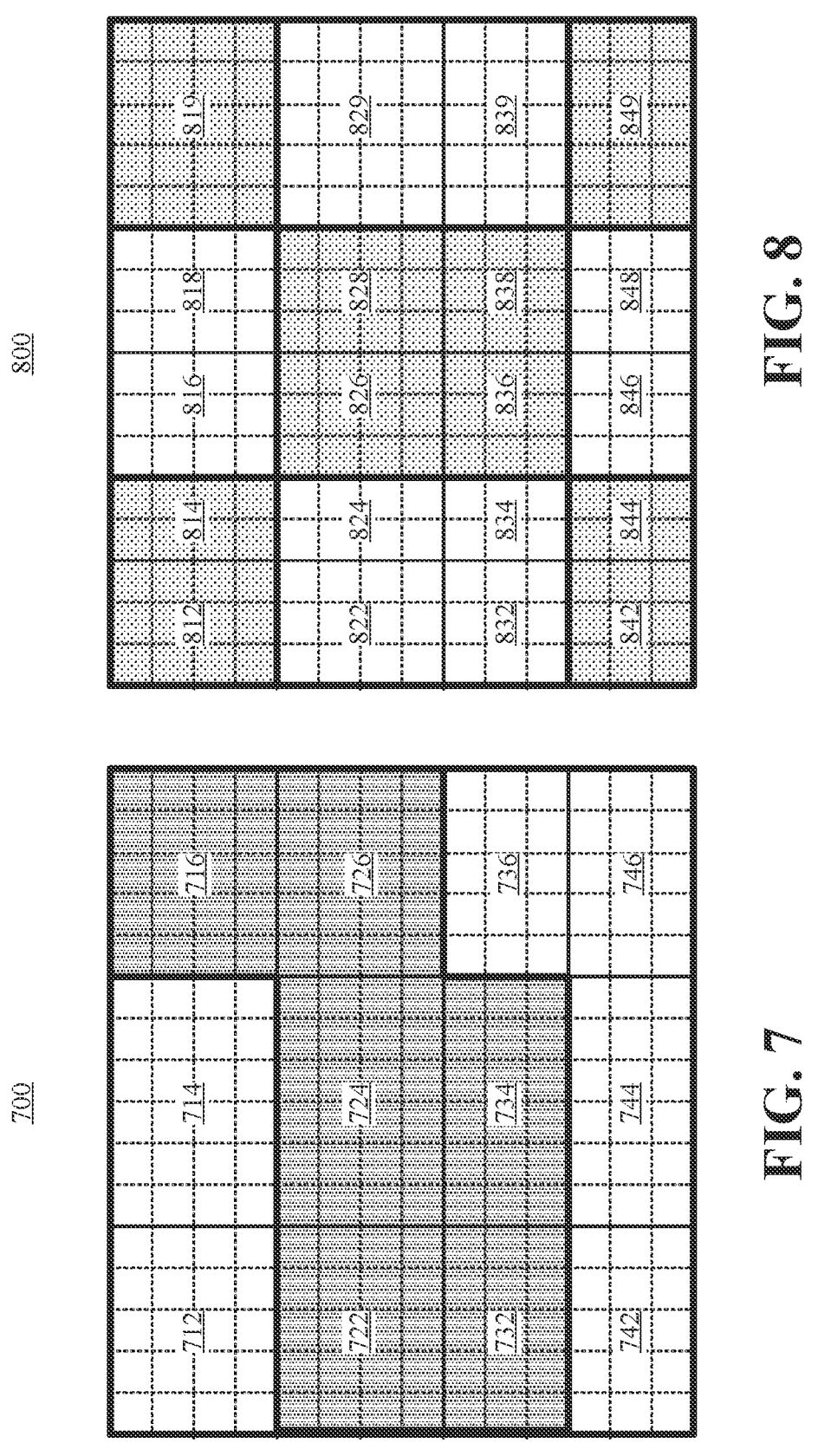

By way of example, FIG. 7 is a schematic diagram illustrating structures of a picture 700 partitioned in a raster-scan slice mode, consistent with some embodiments of the disclosure. In FIG. 7, each dotted-line square represents a CTU, and picture 700 is partitioned into 16×14 CTUs. The CTUs of picture 700 form twelve tiles (e.g., tiles 712-716, 722-726, 732-736, and 742-746), including four tile rows and three tile columns, the boundaries of which are represented by thinner solid lines overlapping the dotted lines. Further, picture 700 is divided into 3 raster-scan slices represented in different shades, the boundaries of which are represented by thicker solid lines overlapping the dotted lines or the thinner solid lines. As illustrated in FIG. 7, the first slice includes tiles 712 and 714. The second slice includes tiles 716, 722-726, and 732-734. The third slice includes tiles 736 and 742-746. The three slices of picture 700 are partitioned in a raster-scan order, and each of the three slices includes an integer number of complete tiles.

By way of example, FIG. 8 is a schematic diagram illustrating structures of a picture 800 partitioned in a rectangular slice mode, consistent with some embodiments of the disclosure. In FIG. 8, each dotted-line square represents a CTU, and picture 800 is partitioned into 16×14 CTUs. The CTUs of picture 800 form twenty tiles, including four tile rows and five tile columns, the boundaries of which are represented by thinner solid lines overlapping the dotted lines. Further, picture 800 is divided into 9 rectangular slices represented in different shades, the boundaries of which are represented by thicker solid lines overlapping the dotted lines or the thinner solid lines. As illustrated in FIG. 8, the nine slices of picture 800 are partitioned in a rectangular manner that forms nine rectangular regions, and each of the nine slices includes an integer number of complete tiles. For example, the first slice includes tiles 812 and 814. The second slice includes tiles 816 and 818. The third slice includes tile 819. The fourth slice includes tiles 822, 824, 832, and 834. The fifth slice includes tiles 826, 828, 836, and 838. The sixth slice includes tiles 829 and 839. The seventh slice includes tiles 842 and 844. The eight slice includes tiles 846 and 848. The ninth slice includes tile 849.

Figure 9:
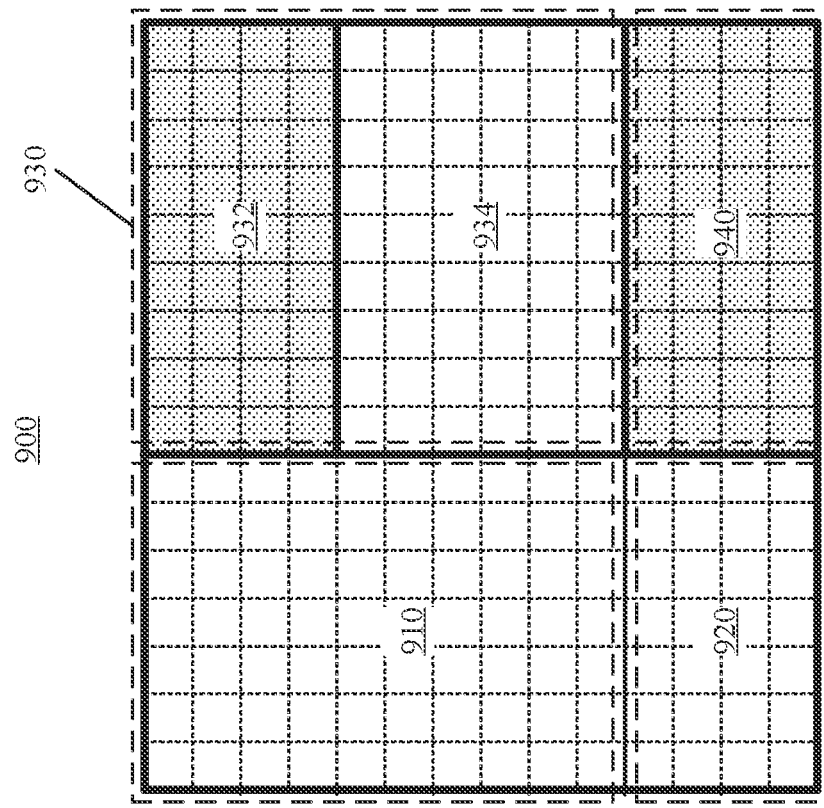
FIG. 9 is a schematic diagram illustrating structures of a picture partitioned in a rectangular slice mode, consistent with some embodiments of the disclosure.

By way of example, FIG. 9 is a schematic diagram illustrating structures of a picture 900 partitioned in a rectangular slice mode, consistent with some embodiments of the disclosure. In FIG. 9, each dotted-line square represents a CTU, and picture 900 is partitioned into 16×14 CTUs. The CTUs of picture 900 form four tiles 910, 920, 930 and 940, including two tile rows and two tile columns, the boundaries of which are represented by dashed lines. For example, a first tile 910 can be on the top left with a size of 7×10 CTUs. A second tile 920 can be on the bottom left with a size of 7×4 CTUs. A third tile 930 can be on the top right with a size of 9×10 CTUs. A fourth tile 940 can be on the bottom right with a size of 9×4 CTUs. Further, picture 900 is divided into 4 rectangular slices represented in different shades, the boundaries of which are represented by thicker solid lines overlapping the dotted lines or the thinner solid lines. As illustrated in FIG. 9, the four slices of picture 900 are partitioned in a rectangular manner that forms four rectangular regions, and each of the four slices includes either an integer number of complete tiles or an integer number of consecutive, complete CTU rows that are within a tile of picture 800. For example, a first slice (represented in white color) can include two complete tiles 910 and 920, with a size of 7×14 CTUs. A second slice (represented in gray color) can include a part (e.g., portion 932) of tile 930, with a size of 9×4 CTUs. A third slice (represented in white color) can include another part (e.g., portion 934) of tile 930, with a size of 9×6 CTUs. A fourth slice (represented in gray color) can include a complete tile 940, with a size of 9×4 CTUs.

Figure 10:
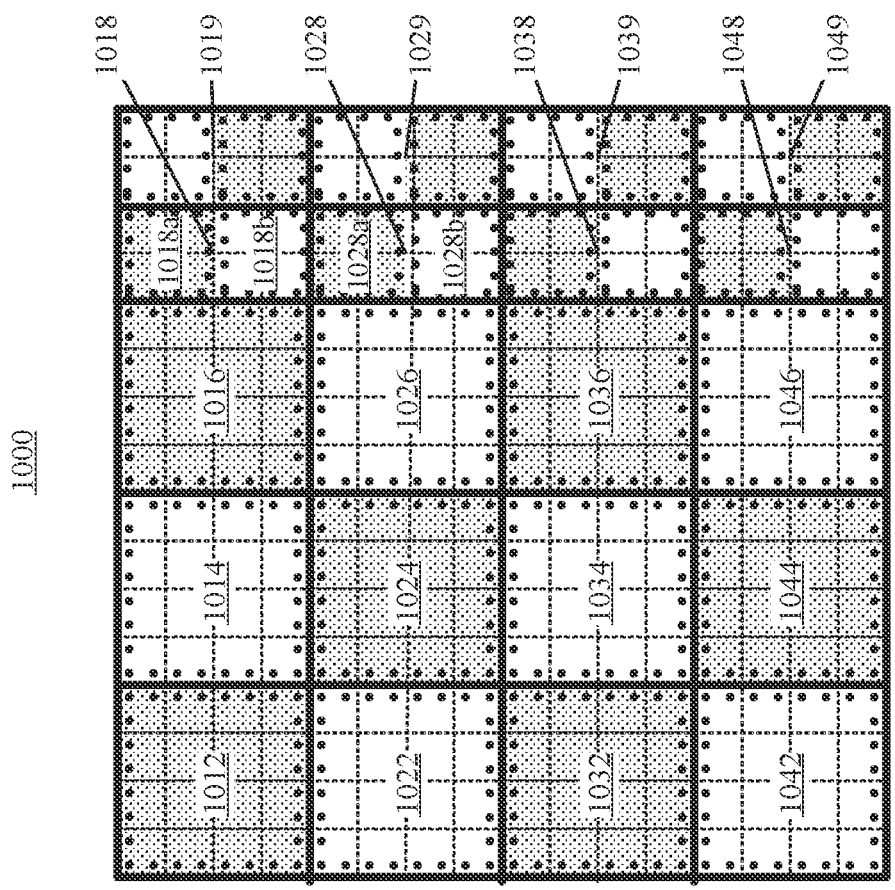
FIG. 10 is a schematic diagram illustrating structures of a picture partitioned in a rectangular slice mode, consistent with some embodiments of the disclosure.

By way of example, FIG. 10 is a schematic diagram illustrating structures of a picture 1000 partitioned in a rectangular slice mode, consistent with some embodiments of the disclosure. In FIG. 10, each dotted-line square represents a CTU, and picture 1000 is partitioned into 16×16 CTUs. The CTUs of picture 1000 form 20 tiles 1012-1019, 1022-1029, 1032-1039, and 1042-1049, including four tile rows and five tile columns, the boundaries of which are represented by thicker solid lines overlapping the dotted lines. As illustrated in FIG. 10, 12 tiles (e.g., tiles 1012-1016, 1022-1026, 1032-1036, and 1042-1046) on the left-hand side each covering one slice of 4 by 4 CTUs. 8 tiles (e.g., tiles 1018, 1019, 1028, 1029, 1038, 1039, 1048 and 1049) on the right-hand side each covering 2 vertically stacked slices of 2 by 2 CTUs, resulting in 28 slices represented in different shades, in which each slice is a subpicture. For example, tile 1018 covers vertically stacked slices 1018a and 1018b, tile 1028 covers vertically stacked slices 1028a and 1028b, and so on. The boundaries of slices/subpictures are represented by thicker dotted lines.

In some embodiments, the subpicture layout or subpicture partitioning can be signaled in a sequence parameter set (SPS). FIG. 11 illustrates an exemplary coding syntax table of a portion of SPS syntax structure 1100 for signaling the subpicture layout, consistent with some embodiments of the disclosure. The pseudocode shown in FIG. 11 can be a part of the VVC standard.

In FIG. 11, a SPS flag 1110 ("sps_subpic_info_present_flag"), when being equal to 1, can specify that subpicture information is present for a CLVS and there may be one or more than one subpicture in each picture of the CLVS. Consistent with the disclosure above, a CLVS is a group of pictures belonging to a same layer, starting with a random access point, and followed by pictures that may depend on each other and the random access point picture. When SPS flag 1110 is equal to 0, subpicture information is not present for the CLVS and there is only one subpicture in each picture of the CLVS. In some embodiments, a SPS flag "sps_res_change_in_clvs_allowed_flag" being equal to 1 specifies that the value of SPS flag 1110 is equal to 0. When a bitstream is a result of a sub-bitstream extraction process and contains only a subset of the subpictures of the input bitstream to the sub-bitstream extraction process, it might be required to set the value of SPS flag 1110 to 1 in the raw byte sequence payload ("RBSP") of the sequence parameter sets ("SPSs").

In FIG. 11, the SPS syntax element "sps_num_subpics_minus1" (e.g., syntax element 1112 in FIG. 11) plus 1 specifies the number of subpictures in each picture in the CLVS. The value of syntax element 1112 ("sps_num_subpics_minus1") is in an inclusive range of 0 to ceil (sps_pic_width_max_in_luma_samples÷CtbSizeY)×ceil (sps_pic_height_max_in_luma_samples÷CtbSizeY)−1. When not present, the value of syntax element 1112 ("sps_num_subpics_minus1") is determined to be equal to 0.

In FIG. 11, a SPS flag 1120 ("sps_independent_subpics_flag"), when being equal to 1, can specify that all subpicture boundaries in the CLVS are treated as picture boundaries and there is no loop filtering across the subpicture boundaries. SPS flag 1120 being equal to 0 does not impose such a constraint. When not present, the value of SPS flag 1120 is determined to be equal to 1.

In FIG. 11, the SPS syntax element "sps_subpic_ctu_top_left_x[i]" (e.g., syntax element 1122 in FIG. 11) specifies a horizontal position of the top left CTU of i-th subpicture in unit of CtbSizeY. The length of this syntax element 1122 is ceil(log 2((sps_pic_width_max_in_luma_samples+CtbSizeY−1)>>CtbLog 2SizeY)) bits. When not present, the value of the SPS syntax element "sps_subpic_ctu_top_left_x[i]" is determined to be equal to 0.

Similarly, the SPS syntax element "sps_subpic_ctu_top_left_y[i]" (e.g., syntax element 1124 in FIG. 11) specifies a vertical position of the top left CTU of i-th subpicture in unit of CtbSizeY. The length of this syntax element 1124 is ceil(log 2((sps_pic_height_max_in_luma_samples+CtbSizeY−1)>>CtbLog 2SizeY)) bits. When not present, the value of the SPS syntax element "sps_subpic_ctu_top_left_y[i]" is determined to be equal to 0.

In FIG. 11, the SPS syntax element "sps_subpic_width_minus1[i]" (e.g., syntax element 1126 in FIG. 11) plus 1 specifies the width of the i-th subpicture in units of CtbSizeY. The length of this syntax element 1126 is ceil(log 2((sps_pic_width_max_in_luma_samples+CtbSizeY−1)>>CtbLog2SizeY)) bits. When not present, the value of the SPS syntax element "sps_subpic_width_minus1[i]" is determined to be equal to ((ps_pic_width_max_in_luma_samples+CtbSizeY−1)>>CtbLog2SizeY)−sps_subpic_ctu_top_left_x[i]−1.

Similarly, the SPS syntax element "sps_subpic_height_minus1[i]" (e.g., syntax element 1128 in FIG. 11) plus 1 specifies the height of the i-th subpicture in units of CtbSizeY. The length of this syntax element 1128 is ceil(log 2((sps_pic_height_max_in_luma_samples+CtbSizeY−1)>>CtbLog2SizeY)) bits. When not present, the value of the SPS syntax element "sps_subpic_height_minus1[i]" is determined to be equal to ((ps_pic_height_max_in_luma_samples+CtbSizeY−1)>>CtbLog2SizeY)−sps_subpic_ctu_top_lefty[i]−1.

In some embodiments, to satisfy bitstream conformance, the shapes of the subpictures are such that each subpicture, when decoded, have its entire left boundary and entire top boundary comprising picture boundaries or comprising boundaries of previously decoded subpictures.

In some embodiments, for each subpicture with subpicture index i in an inclusive range of 0 to the value of syntax element 1112, to satisfy bitstream conformance, the following conditions are true. First, the value of (sps_subpic_ctu_top_left_x[i]×CtbSizeY) is less than (sps_pic_width_max_in_luma_samples−sps_conf_win_right_offset× SubWidthC). Second, the value of ((sps_subpic_ctu_top_left_x[i]+sps_subpic_width_minus1[i]+1)×CtbSizeY) is greater than (sps_conf_win_left_offset×SubWidthC). Third, the value of (sps_subpic_ctu_top_lefty[i]×CtbSizeY) is less than (sps_pic_height_max_in_luma_samples−sps_conf_win_bottom_offset×SubHeightC). Fourth, the value of ((sps_subpic_ctu_top_lefty[i]+sps_subpic_height_minus1[i]+1)×CtbSizeY) is greater than (sps_conf_win_top_offset×SubHeightC).

In FIG. 11, a SPS flag 1130 ("sps_subpic_treated_as_pic_flag[i]"), when being equal to 1, can specify that the i-th subpicture of each coded picture in the CLVS is treated as a picture in the decoding process excluding in-loop filtering operations. SPS flag 1130 equal to 0 specifies that the i-th subpicture of each coded picture in the CLVS is not treated as a picture in the decoding process excluding in-loop filtering operations. When not present, the value of SPS flag 1130 is determined to be equal to 1.

When the value of the SPS syntax element "sps_num_subpics_minus1" (e.g., syntax element 1112 in FIG. 11) is greater than 0 and SPS flag 1130 is equal to 1, for each CLVS of a current layer referring to the SPS, the target set of AUs ("targetAuSet") refers to all the access units ("AUs") starting from the AU comprising the first picture of the CLVS in decoding order, to the AU comprising the last picture of the CLVS in decoding order, inclusive. In some embodiments, to satisfy bitstream conformance, following conditions are true for the target set of layers ("targetLayerSet") that includes the current layer and the layers using the current layer as a reference layer, First, for each AU in targetAuSet, all pictures of the layers in targetLayerSet have the same value of pps_pic_width_in_luma_samples and the same value of pps_pic_height_in_luma_samples. Second, all the SPSs referred to by the layers in targetLayerSet have the same value of syntax element 1112 and the same values of sps_subpic_ctu_top_left_x[j], sps_subpic_ctu_top_left_y[j], sps_subpic_width_minus1[j], sps_subpic_height_minus1[j], and sps_subpic_treated_as_pic_flag[j], respectively, for each value of j in an inclusive range of 0 to syntax element 1112. Third, for each AU in targetAuSet, all pictures of the layers in targetLayerSet have the same value of SubpicIdVal[j] for each value of j in an inclusive range of 0 to syntax element 1112.

In FIG. 11, when being equal to 1, a flag 1140 ("sps_loop_filter_across_subpic_enabled_flag[i]") specifies that in-loop filtering operations across subpicture boundaries is enabled and may be performed across the boundaries of the i-th subpicture in each coded picture in the CLVS. When being equal to 0, flag 1140 specifies that in-loop filtering operations across subpicture boundaries is disabled and not performed across the boundaries of the i-th subpicture in each coded picture in the CLVS. When not present, the value of flag 1140 is determined to be equal to 0.

The SPS syntax element "sps_subpic_id_len_minus1" (e.g., syntax element 1142 in FIG. 11) plus 1 specifies the number of bits used to represent a SPS syntax element "sps_subpic_id[i]", the PPS syntax elements "pps_subpic_id[i]" when present, and the syntax element "sh_subpic_id" when present. In some embodiments, the value of SPS syntax element "sps_subpic_id_len_minus1" is in an inclusive range of 0 to 15. The value of 1<<(sps_subpic_id_len_minus1+1) is greater than or equal to sps_num_subpics_minus1+1.

In FIG. 11, when being equal to 1, a flag 1150 ("sps_subpic_id_mapping_explicitly_signalled_flag") specifies that the subpicture ID mapping is explicitly signaled, either in the SPS or in the PPSs referred to by coded pictures of the CLVS. When being equal to 0, flag 1150 specifies that the subpicture ID mapping is not explicitly signaled for the CLVS. When not present, the value of flag 1150 is determined to be equal to 0.

In FIG. 11, when being equal to 1, a flag 1160 ("sps_subpic_id_mapping_present_flag") specifies that the subpicture ID mapping is signaled in the SPS when flag 1150 is equal to 1. When being equal to 0, flag 1160 specifies that subpicture ID mapping is signaled in the PPSs referred to by coded pictures of the CLVS when flag 1150 is equal to 1.

The SPS syntax element "sps_subpic_id[i]" (e.g., syntax element 1162 in FIG. 11) specifies the subpicture ID of the i-th subpicture. In some embodiments, the length of the SPS syntax element "sps_subpic_id[i]" is the value of "sps_subpic_id_len_minus1" plus 1 bits.

In some embodiments, tile mapping information for tile and slice partitioning can be signaled in a picture parameter set (PPS). FIG. 12 illustrates an exemplary coding syntax table of a portion of PPS syntax structure 1200 for signaling tile mapping and slices in tile mapping, consistent with some embodiments of the disclosure. The pseudocode shown in FIG. 12 can be a part of the VVC standard.

In FIG. 12, a PPS flag 1210 ("pps_no_pic_partition_flag") can specify that no picture partitioning is applied to any picture that refers to the PPS (that includes PPS flag 1210) when it is equal to 1, and can specify that each picture that refers to the PPS may be partitioned into more than one tile or slice when it is equal to 0. In some embodiments, it is a bitstream conformance requirement that the value of PPS flag 1210 is the same for all PPS's that are referred to by coded pictures within a coded layer video sequence (CLVS). In some embodiments, it is also a bitstream conformance requirement that the value of PPS flag 1210 is equal to 0 when the value of syntax element 1112 ("sps_num_subpics_minus1") is greater than 0 or when the value of the syntax element "pps_mixed_nalu_types_in_pic_flag" is equal to 1.

In FIG. 12, the value of a flag 1220 ("pps_subpic_id_mapping_present_flag") being equal to 1 specifies that the subpicture ID mapping is signaled in the PPS. Flag 1220 being equal to 0 specifies that the subpicture ID mapping is not signaled in the PPS. In some embodiments, if a SPS flag "sps_subpic_id_mapping_explicitly_signalled_flag" (e.g., flag 1150) is equal to 0 or a SPS flag "sps_subpic_id_mapping_present_flag" (e.g., flag 1160) is equal to 1, the value of flag 1220 is equal to 0. If SPS flag 1150 is equal to 1 and SPS flag 1160 is equal to 0, the value of flag 1220 is equal to 1.

In FIG. 12, the value of a syntax element "pps_num_subpics_minus1" (e.g., syntax element 1222 in FIG. 12) is equal to the value of the SPS syntax element "sps_num_subpics_minus1" (e.g., syntax element 1112 in FIG. 11). When PPS flag 1210 is equal to 1, the value of syntax element 1222 is determined to be equal to 0.

In FIG. 12, the value of a syntax element "pps_subpic_id_len_minus1" (e.g., syntax element 1224 in FIG. 12) is equal to the value of the SPS syntax element "sps_subpic_id_len_minus1" (e.g., syntax element 1142 in FIG. 11).

In FIG. 12, the value of a syntax element "pps_subpic_id[i]" (e.g., syntax element 1226 in FIG. 12) specifies the subpicture ID of the i-th subpicture. In some embodiments, the length of syntax element 1226 is pps_subpic_id_len_minus1+1 bits.

FIG. 13 shows an exemplary pseudocode for deriving a value for variable SubpicIdVal, according to some embodiments of the present disclosure. As shown in FIG. 13, for each value of index i in an inclusive range of 0 to syntax element 1112 ("sps_num_subpics_minus1"), the value for variable SubpicIdVal can be derived. In some embodiments, to satisfy the bitstream conformance, both of the following constraints apply. First, for any two different values of index i and index j in an inclusive range of 0 to syntax element 1112 ("sps_num_subpics_minus1"), SubpicIdVal[i] is not equal to SubpicIdVal[j]. Second, for each value of index i in an inclusive range of 0 to syntax element 1112 ("sps_num_subpics_minus1"), when the value of SubpicIdVal[i] of a current picture, with nuh_layer_id equal to a particular value layerId, is not equal to the value of SubpicIdVal[i] of a reference picture that has nuh_layer_id equal to layerId, the active entries of the reference picture lists ("RPLs") of the coded slices in the i-th subpicture of the current picture do not include that reference picture.

In FIG. 12, the value of a syntax element "pps_log2_ctu_size_minus5" (e.g., syntax element 1228 in FIG. 12) plus 5 specifies a luma coding tree block size for each CTU. In some embodiments, syntax element 1228 is equal to a syntax element "sps_log2_ctu_size_minus5" signaled in the SPS.

In FIG. 12, the value of a syntax element "pps_num_exp_tile_columns_minus1" (e.g., syntax element 1232 in FIG. 12) plus 1 specifies the number of tile column widths that are explicitly provided. In some embodiments, the value of syntax element 1232 is in an inclusive range of 0 to "PicWidthInCtbsY−1." When PPS flag 1210 is equal to 1, the value of syntax element 1232 is determined to be 0.

In FIG. 12, the value of a syntax element "pps_num_exp_tile_rows_minus1" (e.g., syntax element 1234 in FIG. 12) plus 1 specifies the number of tile row heights that are explicitly provided. In some embodiments, the value of syntax element 1234 is in an inclusive range of 0 to "PicHeightInCtbsY−1." When PPS flag 1210 is equal to 1, the value of syntax element 1234 is determined to be 0.

In FIG. 12, the value of a syntax element "pps_tile_column_width_minus1[i]" (e.g., syntax element 1236 in FIG. 12) plus 1 specifies a width of the i-th tile column in units of CTB, in which the index i is in an inclusive range of 0 to syntax element 1232. In some embodiments, the syntax element "pps_tile_column_width_minus1[num_exp_tile_columns_minus1]" can be used to derive the widths of the tile columns with index greater than syntax element 1232 as specified herein. The value of syntax element 1236 is in an inclusive range of 0 to "PicWidthInCtbsY−1." When not present in the PPS, the value of the syntax element "pps_tile_column_width_minus1[0]" is determined to be equal to "PicWidthInCtbsY−1."

In FIG. 12, the value of a syntax element "pps_tile_row_height_minus1[i]" (e.g., syntax element 1238 in FIG. 12) plus 1 specifies the height of the i-th tile row in units of CTBs, in which the index i is in an inclusive range of 0 to syntax element 1234. In some embodiments, the syntax element "pps_tile_row_height_minus1[pps_num_exp_tile_rows_minus1]" is used to derive a height of the tile rows with index greater than syntax element 1234 as specified herein. The value of 1238 is in an inclusive range of 0 to "PicHeightInCtbsY−1." When not present in the PPS, the value of the syntax element "pps_tile_row_height_minus1[0]" is determined to be equal to "PicHeightInCtbsY−1."

In FIG. 12, when being equal to 1, a flag 1230 ("pps_loop_filter_across_tiles_enabled_flag") specifies that in-loop filtering operations across tile boundaries are enabled and may be performed across tile boundaries in pictures referring to the PPS. When being equal to 0, flag 1230 specifies that in-loop filtering operations across tile boundaries are disabled and not performed across tile boundaries in pictures referring to the PPS. The in-loop filtering operations include the deblocking filter, sample adaptive offset filter, and adaptive loop filter operations. When not present, the value of flag 1230 is determined to be equal to 1.

In FIG. 12, when being equal to 0, a flag 1240 ("pps_rect_slice_flag") specifies that tiles within each slice are in a raster-scan order, and that the slice information is not signaled in the PPS. When being equal to 1, flag 1240 specifies that tiles within each slice cover a rectangular region of the picture, and that the slice information is signaled in the PPS. When not present in the PPS, flag 1240 can be determined to be equal to 1. In some embodiments, when SPS flag 1110 ("sps_subpic_info_present_flag") is equal to 1 or the PPS flag "pps_mixed_nalu_types_in_pic_flag" is equal to 1, the value of flag 1240 is equal to 1.

In FIG. 12, when being equal to 0, a flag 1250 ("pps_single_slice_per_subpic_flag") specifies that each subpicture can include one or more rectangular slices. When being equal to 1, flag 1250 specifies that each subpicture include one single rectangular slice. When not present, flag 1250 is determined to be equal to 1.

In FIG. 12, the syntax element "pps_num_slices_in_pic_minus1" (e.g., syntax element 1252 in FIG. 12) plus 1 specifies the number of rectangular slices in each picture that refers to the PPS. In some embodiments, the value of syntax element 1252 ("pps_num_slices_in_pic_minus1") is in an inclusive range of 0 to the value of syntax element "MaxSlicesPerPicture" minus one. The syntax element "MaxSlicesPerPicture" indicates a level limit for a maximum allowed number of slices in a picture. When PPS flag 1210 is equal to 1, the value of syntax element 1252 ("pps_num_slices_in_pic_minus1") is determined to be equal to 0. That is, no picture partitioning is applied to any picture referring to the PPS, so the picture includes a single slice.

When PPS flag 1250 is equal to 1, the value of syntax element 1252 ("pps_num_slices_in_pic_minus1") is determined to be equal to the value of syntax element 1112 ("sps_num_subpics_minus1") in the SPS. That is, each subpicture includes a single rectangular slice, so the number of rectangular slices in each picture is equal to the number of subpictures in each picture.

In FIG. 12, when being equal to 0, a flag 1260 ("pps_tile_idx_delta_present_flag") specifies that pps_tile_idx_delta_val[i] syntax elements are not present in the PPS, and that pictures referring to the PPS are partitioned into rectangular slice rows and rectangular slice columns in a raster-scan order. When being equal to 1, flag 1260 specifies that pps_tile_idx_delta_val[i] syntax elements can be present in the PPS, and that rectangular slices in pictures referring to the PPS are specified in the order indicated by the values of pps_tile_idx_delta_val[i] syntax elements, in increasing values of the index i. When not present, the value of flag 1260 is determined to be equal to 0.

In FIG. 12, the syntax element "pps_slice_width_in_tiles_minus1[i]" (e.g., syntax element 1262 in FIG. 12) plus 1 specifies a width of the i-th rectangular slice in units of tile columns. In some embodiments, the value of syntax element 1262 ("pps_slice_width_in_tiles_minus1[i]") is in an inclusive range of 0 to "NumTileColumns−1." When not present in the PPS, the value of syntax element 1262 ("pps_slice_width_in_tiles_minus1[i]") is determined to be equal to 0.

In FIG. 12, the syntax element "pps_slice_height_in_tiles_minus1[i]" (e.g., syntax element 1264 in FIG. 12) plus 1 specifies a height of the i-th rectangular slice in units of tile rows. In some embodiments, the value of syntax element 1264 ("pps_slice_height_in_tiles_minus1[i]") is in an inclusive range of 0 to "NumTileRows−1."

When syntax element 1264 ("pps_slice_height_in_tiles_minus1[i]") is not present in the PPS, if the value of "SliceTopLeftTileIdx[i]/NumTileColumns" is equal to the value of "NumTileRows−1," the value of syntax element 1264 is determined to be equal to 0; otherwise, the value of syntax element 1264 is determined to be equal to the value of "pps_slice_height_in_tiles_minus1[i−1]."

In FIG. 12, the value of the syntax element "pps_num_exp_slices_in_tile[i]" (e.g., syntax element 1266 in FIG. 12) specifies a number of slice heights explicitly provided for the slices in the current tile (e.g., the tile containing the i-th slice). In some embodiments, the value of syntax element 1266 ("pps_num_exp_slices_in_tile[i]") is in an inclusive range of 0 to "RowHeight[SliceTopLeftTileIdx[i]/NumTileColumns]−1." When not present, the value of syntax element 1266 is determined to be equal to 0. When syntax element 1266 is equal to 0, the value of the variable "NumSlicesInTile[i]" is derived to be equal to 1, indicating that the tile containing the i-th slice is not split into multiple slices. When syntax element 1266 is greater than 0, the tile containing the i-th slice may be split into multiple slices.

In FIG. 12, the value of the syntax element "pps_exp_slice_height_in_ctus_minus1[i][j]" (e.g., syntax element 1268 in FIG. 12) plus 1 specifies the height of the j-th rectangular slice in the tile containing the i-th slice, in units of CTU rows. The index j is in an inclusive range of 0 to the value of "pps_num_exp_slices_in_tile[i]−1" when syntax element 1266 ("pps_num_exp_slices_in_tile[i]") is greater than 0 (i.e., the tile may be split into multiple slices).

The value of the syntax element "pps_exp_slice_height_in_ctus_minus1[i] [pps_num_exp_slices_in_tile[i]]" is also used to derive the heights of the rectangular slices in the tile containing the i-th slice with index greater than pps_num_exp_slices_in_tile[i]−1 as specified herein. The value of syntax element 1268 ("pps_exp_slice_height_in_ctus_minus1[i][j]") shall be in an inclusive range of 0 to RowHeight[SliceTopLeftTileIdx[i]/NumTileColumns]−1. That is, the maximum possible value of the height of any rectangular slice in the tile should be the height of the current tile.

In FIG. 12, the syntax element "pps_tile_idx_delta_val [i]" (e.g., syntax element 1272 in FIG. 12) specifies the difference between the tile index of the tile containing the first CTU in the (i+1)-th rectangular slice and the tile index of the tile containing the first CTU in the i-th rectangular slice. The value of syntax element 1272 ("pps_tile_idx_delta_val[i]") shall be in an inclusive range of "−NumTiles- InPic+1" to "NumTilesInPic−1". When not present, the value of syntax element 1272 is determined to be equal to 0. When present, the value of syntax element 1272 is not equal to 0.

In some embodiments, when flag 1240 is equal to 1, it is a bitstream conformance requirement that, for any two slices, with picture-level slice indices idxA and idxB, that belong to the same picture and different subpictures, when SubpicIdxForSlice[idxA] is less than SubpicIdxForSlice[idxB], the value of idxA shall be less than idxB.

In FIG. 12, when being equal to 1, a flag 1270 ("pps_loop_filter_across_slices_enabled_flag") specifies that in-loop filtering operations across slice boundaries are enabled and may be performed across slice boundaries in pictures referring to the PPS. When being equal to 0, flag 1270 specifies that in-loop filtering operations across slice boundaries are disabled and not performed across slice boundaries in pictures referring to the PPS. The in-loop filtering operations include the deblocking filter, sample adaptive offset filter, and adaptive loop filter operations. When not present, the value of flag 1270 is determined to be equal to 0.

The variable NumTileColumns, specifying the number of tile columns, and the list colWidth[i] for i ranging from 0 to NumTileColumns−1, inclusive, specifying the width of the i-th tile column in units of CTBs, can be derived. FIG. 14 shows an exemplary pseudocode including derivation of variables NumTileColumns, according to some embodiments of the present disclosure.

The variable NumTileRows, specifying the number of tile rows, and the list RowHeight[j] for j ranging from 0 to NumTileRows−1, inclusive, specifying the height of the j-th tile row in units of CTBs, can be derived. FIG. 15 shows an exemplary pseudocode including derivation of variable NumTileRows, according to some embodiments of the present disclosure. The variable NumTilesInPic is set equal to NumTileColumns×NumTileRows.

The list tileColBd[i] for i ranging from 0 to NumTileColumns, inclusive, specifying the location of the i-th tile column boundary in units of CTBs, can be derived. FIG. 16 shows an exemplary pseudocode including derivation of variable tileColBd[i], according to some embodiments of the present disclosure. As shown in FIG. 16, the size of the array tileColBd[ ] is one greater than the actual number of tile columns.

The list tileRowBd[j] for j ranging from 0 to NumTileRows, inclusive, specifying the location of the j-th tile row boundary in units of CTBs, can be derived. FIG. 17 shows an exemplary pseudocode including derivation of variable tileRowBd[j], according to some embodiments of the present disclosure. As shown in FIG. 17, the size of the array tileRowBd[ ] is one greater than the actual number of tile rows.

The lists CtbToTileColBd[ctbAddrX] and ctbToTileColIdx[ctbAddrX] for ctbAddrX ranging from 0 to PicWidthInCtbsY, inclusive, specifying the conversion from a horizontal CTB address to a left tile column boundary in units of CTBs and to a tile column index, respectively, can be derived. FIG. 18 shows an exemplary pseudocode including derivation of variables CtbToTileColBd and ctbToTileColIdx, according to some embodiments of the present disclosure. As shown in FIG. 18, the size of the arrays CtbToTileColBd[ ] and ctbToTileColIdx[ ] are one greater than the actual picture width in CTBs.

The lists CtbToTileRowBd[ctbAddrY] and ctbToTileRowIdx[ctbAddrY] for ctbAddrY ranging from 0 to PicHeightInCtbsY, inclusive, specifying the conversion from a vertical CTB address to a top tile column boundary in units of CTBs and to a tile row index, respectively, can be derived. FIG. 19 shows an exemplary pseudocode including derivation of variables CtbToTileRowBd and ctbToTileRowIdx, according to some embodiments of the present disclosure. As shown in FIG. 19, the sizes of the arrays CtbToTileRowBd[ ] and ctbToTileRowIdx[ ] are one greater than the actual picture height in CTBs.

The lists SubpicWidthInTiles[i] and SubpicHeightInTiles[i], for i ranging from 0 to syntax element 1112 ("sps_num_subpics_minus1"), inclusive, specifying the width and the height of the i-th subpicture in tile columns and rows, respectively, and the list subpicHeightLessThanOneTileFlag[i], for i ranging from 0 to syntax element 1112 ("sps_num_subpics_minus1"), inclusive, specifying whether the height of the i-th subpicture is less than one tile row, can be derived. FIG. 20 shows an exemplary pseudocode including derivation of variables SubpicWidthInTiles and SubpicHeightInTiles, according to some embodiments of the present disclosure. As shown in FIG. 20, when a tile is partitioned into multiple rectangular slices and only a subset of the rectangular slices of the tile is included in the i-th subpicture, the tile is counted as one tile in the value of SubpicHeightInTiles[i].

When flag 1240 ("pps_rect_slice_flag") is equal to 1, the list NumCtusInSlice[i] for i ranging from 0 to syntax element 1252 ("pps_num_slices_in_pic_minus1"), inclusive, specifying the number of CTUs in the i-th slice, the list SliceTopLeftTileIdx[i] for i ranging from 0 to syntax element 1252 ("pps_num_slices_in_pic_minus1"), inclusive, specifying the tile index of the tile containing the first CTU in the slice, and the matrix CtbAddrInSlice[i][j] for i ranging from 0 to syntax element 1252 ("pps_num_slices_in_pic_minus1"), inclusive, and j ranging from 0 to NumCtusInSlice[i]−1, inclusive, specifying the picture raster scan address of the j-th CTB within the i-th slice, and the variable NumSlicesInTile[i], specifying the number of slices in the tile containing the i-th slice, can be derived. FIG. 21 and FIG. 22 show exemplary pseudocodes including derivation of variables NumCtusInSlice, SliceTopLeftTileIdx, CtbAddrInSlice, and NumSlicesInTile, according to some embodiments of the present disclosure.

To satisfy bitstream conformance, the values of NumCtusInSlice[i] for i ranging from 0 to syntax element 1252 ("pps_num_slices_in_pic_minus1"), inclusive, is greater than 0. Additionally, to satisfy bitstream conformance, the matrix CtbAddrInSlice[i][j] for i ranging from 0 to syntax element 1252 ("pps_num_slices_in_pic_minus1"), inclusive, and j ranging from 0 to NumCtusInSlice[i]−1, inclusive, includes each of all CTB addresses in the range of 0 to PicSizeInCtbsY−1, inclusive, once and only once.

The lists NumSlicesInSubpic[i], SubpicLevelSliceIdx[j], and SubpicIdxForSlice[j], specifying the number of slices in the i-th subpicture, the subpicture-level slice index of the slice with picture-level slice index j, and the subpicture index of the slice with picture-level slice index j, respectively, can be derived. FIG. 23 shows an exemplary pseudocode including derivation of variables NumSlicesInSubpic, SubpicLevelSliceIdx, and SubpicIdxForSlice, according to some embodiments of the present disclosure.

Embodiments of the present disclosure provide signaling a flag in SPS to indicate whether the pictures in the current CLVS is partitioned into more than one tile or slice, and signaling a flag in PPS with the same value as the flag signaled in SPS. FIG. 24 illustrates an exemplary coding syntax table of a portion of SPS syntax structure 2400 signaled in the SPS, with emphasis in bold, consistent with some embodiments of the disclosure. Syntax structure 2400 modified based on syntax structure 1100 of FIG. 11. As shown in FIG. 24, changes from the previous syntax shown in FIG. 11 are shown in highlighted patterns.

Compared to the SPS syntax shown in FIG. 11, in some embodiments, a SPS flag 2410 ("sps_no_pic_partition_flag") is signalled before SPS flag 1110 in the SPS syntax shown in FIG. 24. SPS flag 2410 ("sps_no_pic_partition_flag") equal to 1 specifies that no picture partitioning is applied to each picture referring to the SPS. SPS flag 2410 equal to 0 specifies that each picture referring to the SPS may be partitioned into more than one tile or slice.

In some embodiments, one or more additional constraints associated with the syntax shown in FIG. 24 may be introduced. For example, an additional constraint can be that the value of flag 1210 ("pps_no_pic_partition_flag") signalled in the PPS is equal to the value of SPS flag 2410 ("sps_no_pic_partition_flag") in the associated SPS.

In addition, another constraint can be added to guarantee that when the value of SPS flag 2410 is equal to 1, the value of syntax element 1112 ("sps_num_subpics_minus1") is 0. Because a subpicture is a set of slices, when there is no partitioning of slices (e.g., SPS syntax element flag being 1), there would be no partitioning of subpicture (e.g., SPS syntax element 1112 being 0).

FIG. 25 illustrates another exemplary coding syntax table of a portion of SPS syntax structure 2500 signaled in the SPS, with emphasis in bold, consistent with some embodiments of the disclosure. Syntax structure 2500 is also modified based on syntax structure 1100 of FIG. 11. As shown in FIG. 25, changes from the previous syntax shown in FIG. 11 are shown in highlighted patterns.

As discussed above, in some embodiments, the number of subpicture can only be 1 when SPS flag 2410 ("sps_no_pic_partition_flag") is equal to 1. Accordingly, SPS flag 1110 ("sps_subpic_info_present_flag") or SPS syntax element 1112 ("sps_num_subpics_minus1") may be conditionally signaled based on the value of SPS flag 2410 ("sps_no_pic_partitoin_flag"). For example, as shown in FIG. 25, SPS flag 1110 ("sps_subpic_info_present_flag") is signaled when SPS flag 2410 ("sps_no_pic_partitoin_flag") is equal to 0, and the signaling of SPS flag 1110 ("sps_subpic_info_present_flag") can be skipped when the value of SPS flag 2410 ("sps_no_pic_partitoin_flag") is equal to 1. When the signaling of SPS flag 1110 is skipped, the value of SPS flag 1110 ("sps_subpic_info_present_flag") can be determined to be 0. In other words, when the SPS does not allow the partitioning of the picture, the subpicture information is not present.

In the syntax of FIG. 25, SPS flag 2410 ("sps_no_pic_partitoin_flag") equal to 1 specifies that no picture partitioning is applied to each picture referring to the SPS. SPS flag 2410 equal to 0 specifies that each picture referring to the SPS may be partitioned into more than one tile or slice. In the syntax of FIG. 25, SPS flag 1110 ("sps_subpic_info_present_flag") equal to 1 specifies that subpicture information is present for the CLVS and there may be one or more than one subpicture in each picture of the CLVS. SPS flag 1110 ("sps_subpic_info_present_flag") equal to 0 specifies that subpicture information is not present for the CLVS and there is only one subpicture in each picture of the CLVS. When not present, the value of SPS flag 1110 ("sps_subpic_info_present_flag") can be determined to be equal to 0.

FIG. 26 illustrates another exemplary coding syntax table of a portion of SPS syntax structure 2600 signaled in the SPS, with emphasis in bold, consistent with some embodiments of the disclosure. Syntax structure 2600 is also modified based on syntax structure 1100 of FIG. 11. As shown in FIG. 26, changes from the previous syntax shown in FIG. 11 are shown in highlighted patterns.

As shown in FIG. 26, in some embodiments, SPS flag 1112 ("sps_num_subpics_minus1") is signaled when flag 1110 is equal to 1 and SPS flag 2410 is equal to 0. Alternatively stated, the signaling of SPS flag 1112 ("sps_num_subpics_minus1") is skipped when SPS flag 2410 ("sps_no_pic_partition_flag") is equal to 1. As discussed above, when the value of SPS flag 2410 is 1, the value of SPS flag 1112 ("sps_num_subpics_minus1") is determined to be 0, indicating that. In other words, when the SPS does not allow the partitioning of the picture, the number of subpictures can only be 1.

In the syntax of FIG. 26, SPS flag 2410 ("sps_no_pic_partition_flag") equal to 1 specifies that no picture partitioning is applied to each picture referring to the SPS. SPS flag 2410 being equal to 0 specifies that each picture referring to the SPS may be partitioned into more than one tile or slice. In the syntax of FIG. 26, SPS flag 1112 ("sps_num_subpics_minus1") plus 1 specifies the number of subpictures in each picture in the CLVS. The value of SPS flag 1112 ("sps_num_subpics_minus1") is in a range of 0 to Ceil (sps_pic_width_max_in_luma_samples CtbSizeY)×Ceil (sps_pic_height_max_in_luma_samples_CtbSizeY)−1, inclusive. When not present, the value of SPS flag 1112 ("sps_num_subpics_minus1") can be determined to be equal to 0.

In some embodiments, the constraint that the value of PPS flag 1210 ("pps_no_pic_partition_flag") can be the same for all PPSs referred to by coded pictures within a CLVS may be removed. In other words, for pictures within the same CLVS, different PPSs can independently signal PPS flag 1210 ("pps_no_pic_partition_flag") with different values. As a result, within one CLVS, it is allowed to have some pictures, with PPS flag 1210 ("pps_no_pic_partition_flag") equal to 1, not partitioned into multiple slices or tiles, and some other pictures, with PPS flag 1210 ("pps_no_pic_partition_flag") equal to 0, being partitioned into more than one tiles or slices. Therefore, the constraint that the value of PPS flag 1210 ("pps_no_pic_partition_flag") shall be the same for all PPSs referred to by coded pictures within a CLVS can be removed.

Figure 27A:
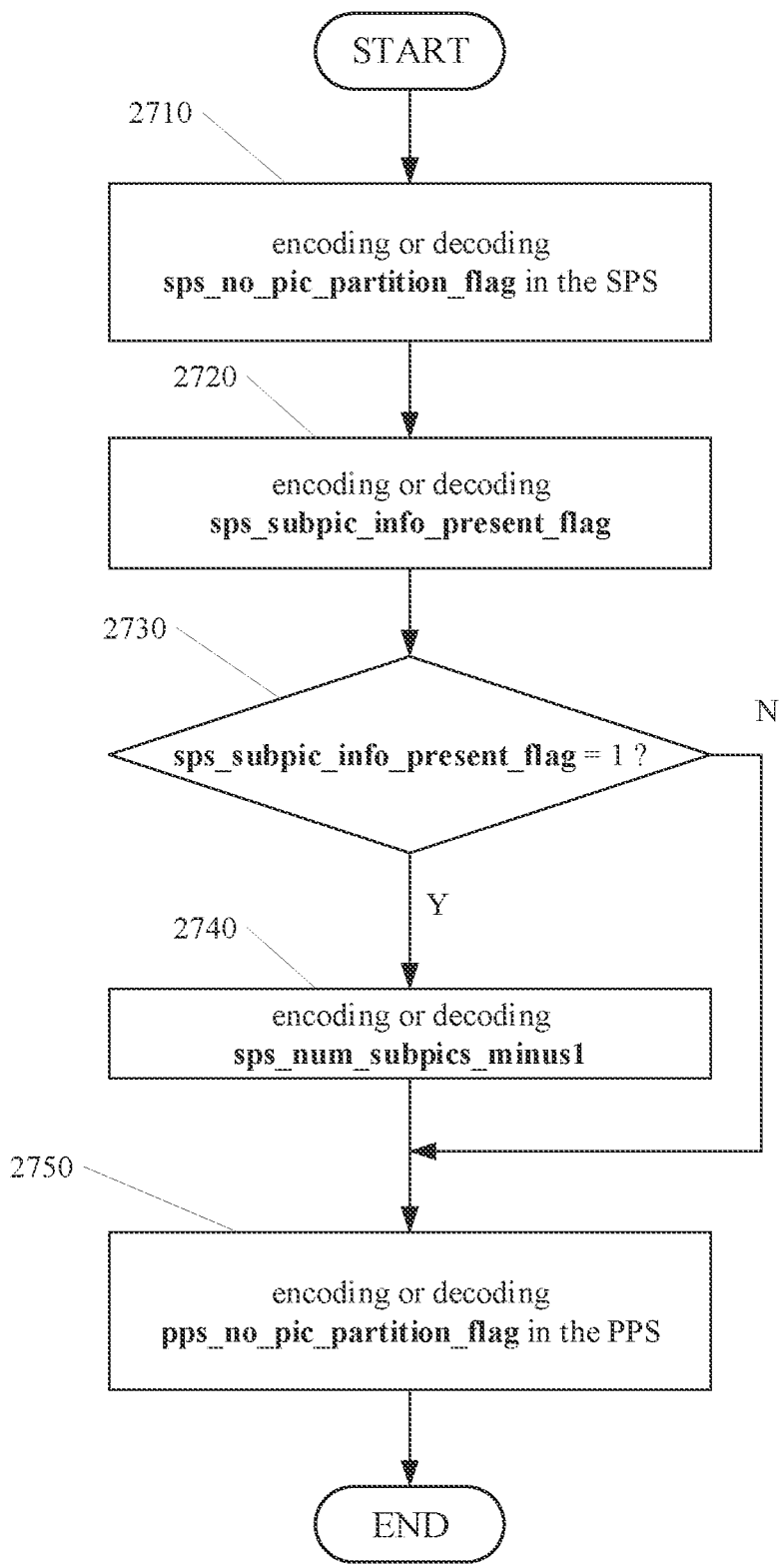
FIGS. 27A-FIG. 27C illustrate flowcharts of exemplary video encoding or decoding methods, consistent with some embodiments of the disclosure.
Figure 27B:
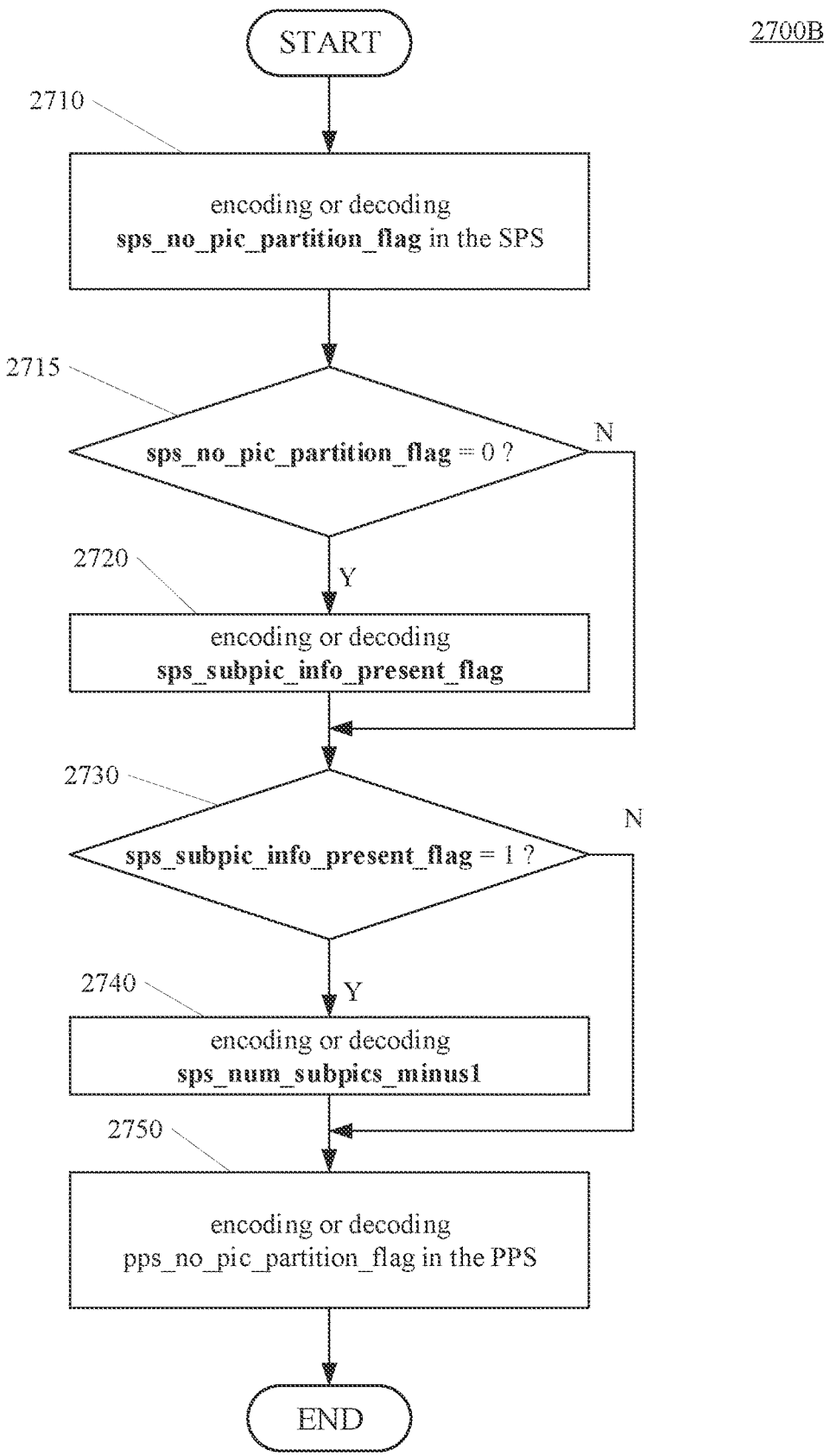
Figure 27C:
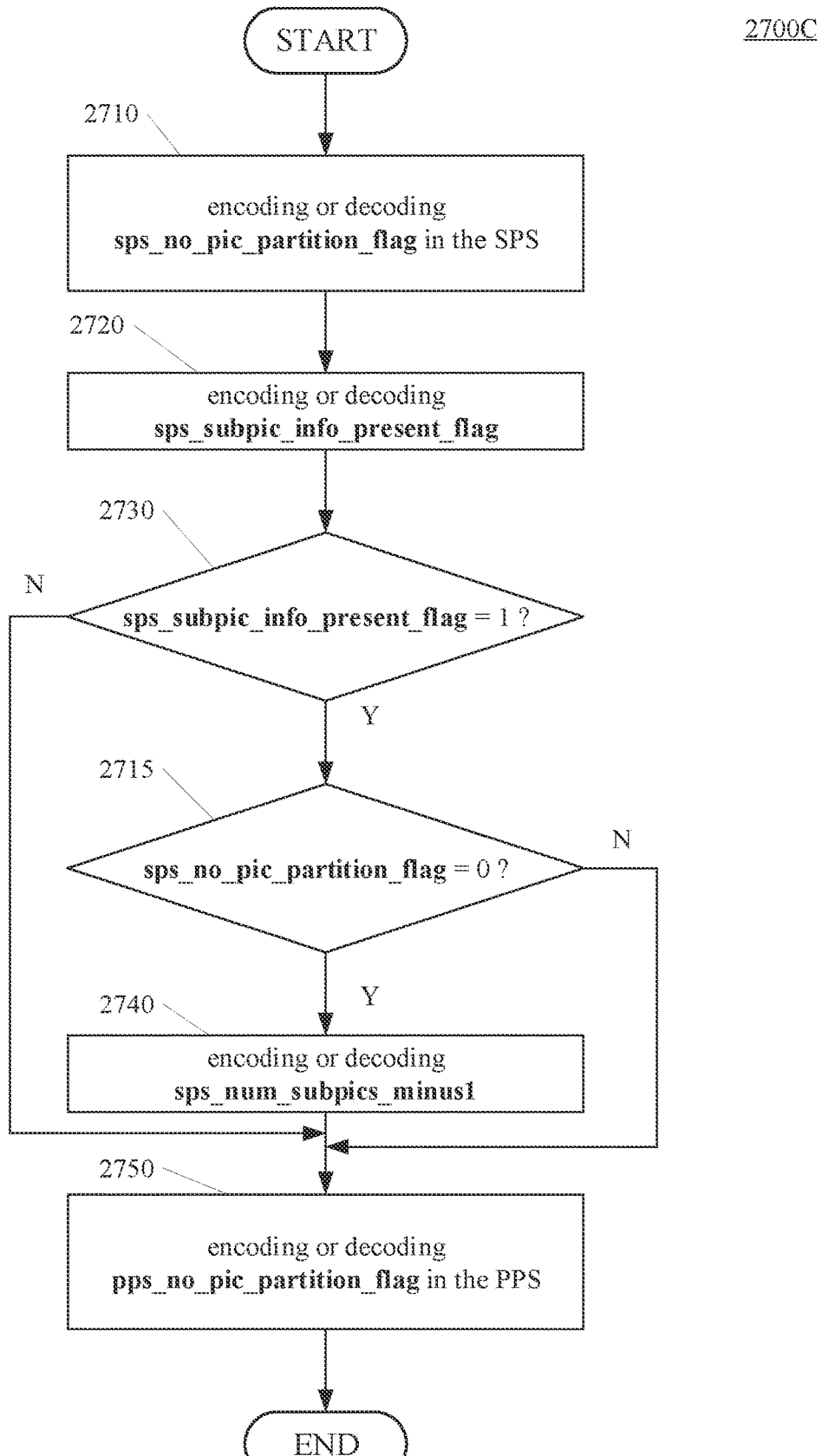

FIGS. 27A-FIG. 27C respectively illustrate flowcharts of exemplary video encoding or decoding methods 2700A, 2700B, and 2700C, consistent with some embodiments of the disclosure. By applying any of video encoding or decoding methods 2700A, 2700B, and 2700C, one or more SPS syntax elements or flags can be signaled conditionally based on the value of other SPS syntax element(s) or flag(s), which reduces the number of the output bits and achieves a higher coding performance. When not signaled in the SPS, values of SPS syntax element(s) or flag(s) can be determined or assigned accordingly. In some embodiments, methods 2700A-2700C can be performed by an encoder (e.g., an encoder performing process 200A in FIG. 2A or process 200B in FIG. 2B) or a decoder (e.g., a decoder performing decoding process 300A in FIG. 3A or decoding process 300B in FIG. 3B) to generate or decode bitstream 500 shown in FIG. 5. For example, the encoder or the decoder can be implemented as one or more software or hardware components of an apparatus (e.g., apparatus 400 in FIG. 4) for encoding or transcoding a video sequence (e.g., video sequence 202 in FIG. 2A or in FIG. 2B) to generate the bitstream (e.g., video bitstream 228 in FIG. 2A or in FIG. 2B) for the video sequence, or decoding the bitstream (e.g., video bitstream 228 in FIG. 3A or FIG. 3B) to reconstruct a video stream (e.g., video stream 304 in FIG. 3A or FIG. 3B)

of the bitstream. For example, one or more processors (e.g., processor 402 in FIG. 4) can perform methods 2700A-2700C.

Syntax structure 2400 shown in FIG. 24 can be applied in method 2700A. At step 2710, the apparatus is configured to encode or decode, in a sequence parameter set (SPS) of a bitstream, SPS flag 2410 ("sps_no_pic_partition_flag"). SPS flag 2410 indicates whether one or more pictures in a coded layer video sequence (CLVS) referring to the SPS is allowed to be partitioned into tiles or slices.

At step 2720, the apparatus is configured to encode or decode, in the SPS, SPS flag 1110 ("sps_subpic_info_present_flag"). SPS flag 1110 indicates whether subpicture information is present for the CLVS referring to the SPS.

At step 2730, the apparatus is configured to determine whether SPS flag 1110 is equal to one. In response to SPS flag 1110 being zero (step 2730—No), the apparatus bypasses step 2740 and continues the encoding or decoding process without signaling SPS syntax element 1112 ("sps_num_subpics_minus1").

In response to SPS flag 1110 being equal to one (step 2730-Yes), the apparatus performs step 2740, and is configured to encode or decode, in the SPS, SPS syntax element 1112 ("sps_num_subpics_minus1"). SPS syntax element 1112 ("sps_num_subpics_minus1") is a sequence parameter associated with the number of subpictures in each picture in the CLVS referring to the SPS. Particularly, SPS syntax element 1112 plus 1 specifies the number of subpictures in each picture in the CLVS. It is appreciated that while this example flowchart refers to SPS flag 1110 as being equal to 1 to result in step 2740 being performed, it is appreciated that the indications of 0s and 1s are a design choice and that the outcomes can be reversed for SPS flag 1110 and other syntax elements (e.g., SPS flag 1110 being equal to 0 results in step 2740 being performed).

At step 2750, the apparatus is configured to encode or decode, in a picture parameter set (PPS) following the SPS, a PPS flag 1210 ("pps_no_pic_partition_flag") equal to SPS flag 1110 for indicating whether the picture referring to the PPS is allowed to be partitioned.

Syntax structure 2500 shown in FIG. 25 can be applied in method 2700B. Compared to method 2700A, in method 2700B, after step 2170, the apparatus performs step 2715 and is configured to determine whether SPS flag 2410 is equal to zero (indicating picture(s) associated with the SPS being allowed to be partitioned). In response to SPS flag 2410 being one (step 2715—No), indicating picture(s) associated with the SPS being unpartitioned, the apparatus bypasses step 2720 and skips encoding or decoding SPS flag 1110. In some embodiments, the value of SPS flag 1110 can be determined to be 0 when the signaling of SPS flag 1110 is skipped.

Syntax structure 2600 shown in FIG. 26 can be applied in method 2700C. Compared to methods 2700A and 2700B, in method 2700C, in response to SPS flag 1110 being equal to one (step 2730—Yes), the apparatus performs step 2715 and is configured to determine whether SPS flag 2410 is equal to zero. In response to SPS flag 2410 being one (step 2715—No), indicating picture(s) associated with the SPS being unpartitioned, the apparatus bypasses step 2740 and skips encoding or decoding SPS syntax element 1112 associated with the number of subpictures in each picture in the CLVS referring to the SPS. In some embodiments, the value of SPS syntax element 1112 can be determined to be 0 when the signaling of SPS syntax element 1112 is skipped.

By methods 2700B or 2700C, SPS flag 1110 ("sps_subpic_info_present_flag") or SPS syntax element 1112 ("sps_num_subpics_minus1") may be conditionally signaled based on the value of SPS flag 2410 ("sps_no_pic_partitoin_flag").

Embodiments of the present disclosure provide an updated method to signal flag 1240 ("pps_rect_slice_flag"). FIG. 28 shows an exemplary modified coding syntax table of a portion of PPS syntax structure 2800 including an updated flag indicating rectangular slice mode or raster-scan slice mode, according to some embodiments of the present disclosure. As shown in FIG. 28, changes from the previous syntax shown in FIG. 12 are shown in highlighted patterns.

In VVC (e.g., VVC draft 9), flag 1240 ("pps_rect_slice_flag") is the flag to indicate whether rectangular slice mode or raster-scan slice mode is used. As shown in FIG. 12, flag 1240 ("pps_rect_slice_flag") can be signaled when the number of tiles is greater than 1. When a picture contains only one tile, the raster-scan slice including only one tile can also be indicated by the rectangular slice mode. Accordingly, there is no need to use raster-scan slice mode or to signal flag 1240 ("pps_rect_slice_flag") when the number of tiles is equal to 1. Therefore, the signaling of flag 1240 ("pps_rect_slice_flag") is skipped and the value of flag 1240 is determined to be 1, indicating that the rectangular slice mode is applied.

In some cases, the signaling of flag 1240 is not necessary and redundant when the number of tiles is less than a predetermined value. When the tile number in a picture is less than 4, there is at most one tile column or one tile row in the picture, and thus the raster-scan slice can also be indicated by the rectangular slice. So in some embodiments, the slice partitioning of raster-scan slice is indicated by rectangular slice mode as long as the number of tiles is less than 4. Alternatively stated, when the number of tiles is two or three, the partitioning can be indicated by rectangular slice mode. By adopting this modification, the consistency and efficiency of the encoding and decoding process for the video stream can be improved.

Therefore, as shown in FIG. 28, the signaling of flag 1240 ("pps_rect_slice_flag") can be skipped and the value of flag 1240 is determined to be 1 when the number of tiles is less than 4. When the number of tiles is greater than 3, flag 1240 ("pps_rect_slice_flag") is signaled. In the syntax shown in FIG. 28, flag 1240 ("pps_rect_slice_flag") equal to 0 specifies that raster-scan slice mode is in use for each picture referring to PPS (i.e., tiles within each slice are in raster scan order) and the slice information is not signaled in PPS. flag 1240 ("pps_rect_slice_flag") equal to 1 specifies that rectangular slice mode is in use for each picture referring to PPS (i.e., tiles within each slice cover a rectangular region of the picture) and the slice information is signaled in the PPS. When not present, flag 1240 ("pps_rect_slice_flag") is determined to be equal to 1. When SPS flag 1110 ("sps_subpic_info_present_flag") is equal to 1 or a PPS flag "pps_mixed_nalu_types_in_pic_flag" is equal to 1, the value of flag 1240 ("pps_rect_slice_flag") is equal to 1.

Figure 29:
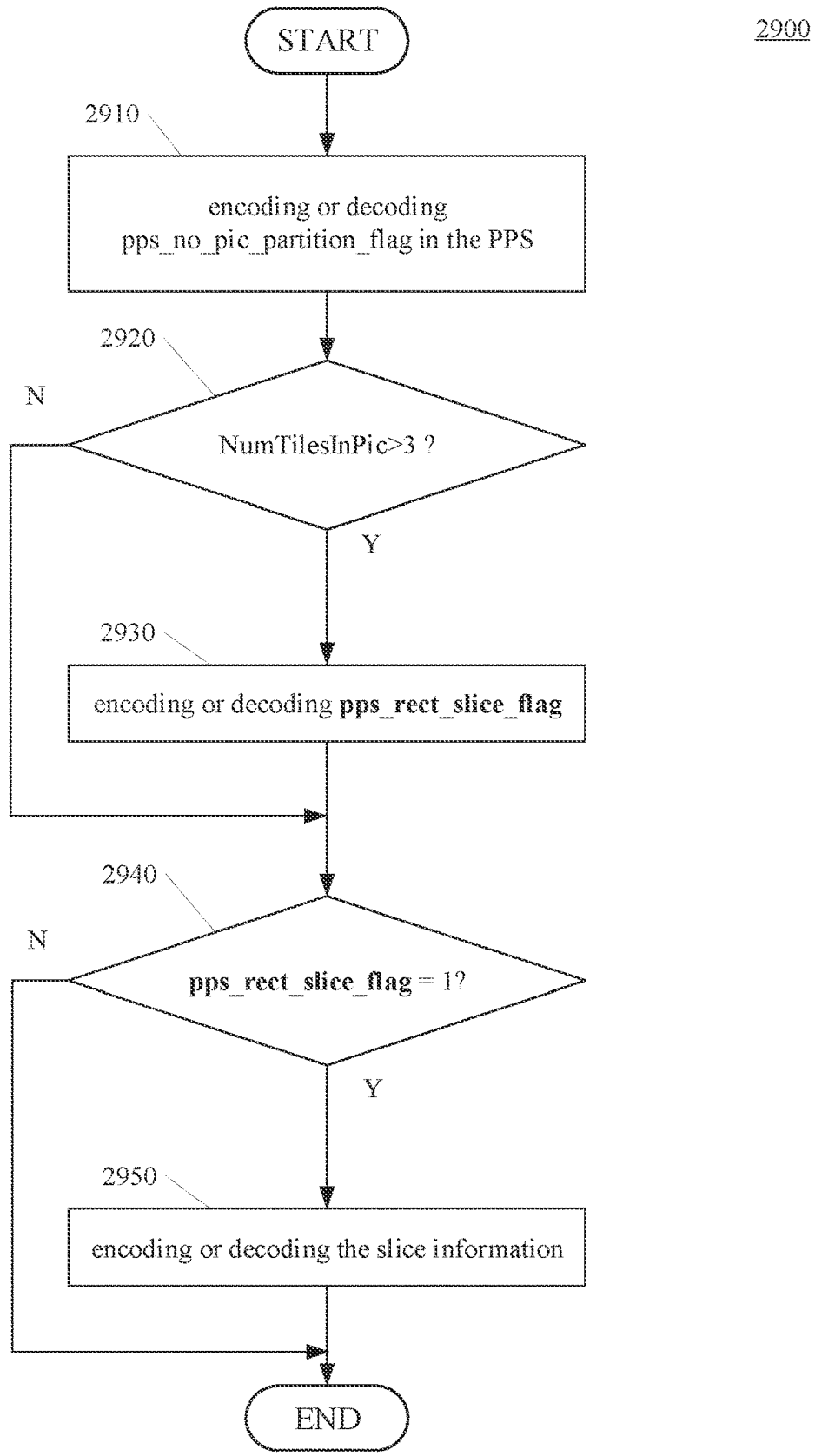
FIG. 29 illustrates a flowchart of an exemplary video encoding or decoding method, consistent with some embodiments of the disclosure.

FIG. 29 illustrates a flowchart of an exemplary video encoding or decoding method 2900, consistent with some embodiments of the disclosure. Similar to methods 2700A-2700C, method 2900 can be performed by an encoder or a decoder, which can be implemented as one or more software or hardware components of an apparatus (e.g., apparatus 400 in FIG. 4) for encoding or transcoding a video sequence, or decoding the bitstream to reconstruct a video stream. For example, one or more processors (e.g., processor 402 in FIG. 4) can perform method 2900.

Syntax structure 2800 shown in FIG. 28 can be applied in method 2900. At step 2910, the apparatus is configured to encode or decode, in the PPS following the SPS, a PPS flag 1210 ("pps_no_pic_partition_flag") for indicating whether the picture referring to the PPS is partitioned. As explained above, in some embodiments, for pictures within the same CLVS, different PPSs can independently signal PPS flag 1210 with different values. For example, at step 2910, the apparatus can encode or decode, in a first PPS, a first flag indicating whether a first picture referring to the first PPS is partitioned into tiles or slices, and encode or decode, in a second PPS, a second flag indicating whether a second picture referring to the second PPS is partitioned, in which the first flag and the second flag have different values. For example, the first flag with a first value may indicate the first picture of the CLVS is unpartitioned, while the second flag with a second value being different from the first value indicates that the second picture is allowed to be partitioned. That is, it is possible that the second picture of the CLVS is partitioned, but the second picture may also be unpartitioned.

At step 2920, the apparatus is configured to determine whether the number of tiles of a picture (e.g., the variable NumTilesInPic) is greater than a threshold value (e.g., 3). In some embodiments, the threshold value is an integer greater than 1.

In response to the number of tiles of the picture being greater than the threshold value (step 2920—Yes), the apparatus performs step 2930 to encode or decode flag 1240 ("pps_rect_slice_flag") indicating a slice mode being applied to the picture. For example, when a raster-scan slice mode is applied to the picture referring to the PPS, flag 1240 ("pps_rect_slice_flag") is encoded or decoded with a first value (e.g., 0), and when a rectangular slice mode is applied to the picture referring to the PPS, flag 1240 ("pps_rect_slice_flag") is encoded or decoded with a second value (e.g., 1) different from the first value.

In response to the number of tiles of the picture being no greater than the threshold value (step 2920—No), step 2930 is skipped. In some embodiments, when the signaling of flag 1240 ("pps_rect_slice_flag") is skipped, the value of flag 1240 is determined to be the second value (e.g., 1), indicating that the rectangular slice mode is applied.

At step 2940, the apparatus is configured to determine whether the rectangular slice mode is applied according to the value of flag 1240. When the rectangular slice mode is applied to the picture referring to the PPS (step 2940—Yes), the apparatus performs step 2950 to encode or decode the slice information in the PPS. When the raster-scan slice mode is applied to the picture referring to the PPS (step 2940—No), step 2950 is skipped.

By method 2900, the constraint is removed so that different PPSs associated with pictures within the same CLVS can signal PPS flag 1210 with different values. In addition, the signaling of flag 1240 can be simplified and be performed conditionally according to the number of tiles. Furthermore, the slice information can also be signaled conditionally in the PPS according to the slice mode used for the partitioning.

In VVC (e.g., VVC draft 9), according to the definition of rectangular slice mode, there are two cases of rectangular slice supported in VVC. In the first case, a rectangular slice includes a number of complete tiles that collectively form a rectangular region of the picture. In the second case, a rectangular slice includes a number of consecutive complete CTU rows of one tile that collectively form a rectangular region of the picture. But the semantics of pps_slice_flag only specifies the first case when pps_slice_flag is equal to 1. As a result, the previous semantics in VVC may be inaccurate.

Embodiments of the present disclosure provide updated semantics for flag 1240 ("pps_rect_slice_flag"). In some embodiments, both the case that a rectangular slice contains one or more complete tiles (e.g., the first slice including complete tiles 910 and 920 in FIG. 9) and the case that a tile contains one or more slices (e.g., tile 930 including portions 932 and 934 corresponding to the second slice and the third slices in FIG. 9) are specified in the semantics of flag 1240 ("pps_rect_slice_flag") equal to 1. Alternatively stated, the semantic for flag 1240 is modified to reflect that flag 1240 ("pps_rect_slice_flag") equal to 1 specifies that tiles within each slice cover a rectangular region of the picture, "or each slice within a tile covers a rectangular region of the picture," and the slice information is signalled in the PPS.

Alternatively, the semantic for flag 1240 can also be modified to reflect that flag 1240 ("pps_rect_slice_flag") equal to 1 specifies that tiles within each slice cover a rectangular region of the picture "or each slice within a tile covers one or more consecutive complete CTU rows of the tile," and the slice information is signalled in the PPS.

In some other embodiments, the semantics of flag 1240 ("pps_rect_slice_flag") can refer to raster scan slice mode and rectangular slice mode directly. For example, the semantic for flag 1240 can also be modified to reflect that flag 1240 ("pps_rect_slice_flag") equal to 0 specifies that "a raster-san slice mode is in use for each picture referring to the PPS" and the slice information is not signalled in PPS, and flag 1240 ("pps_rect_slice_flag") equal to 1 specifies that "a rectangular slice mode is in use for each picture referring to the PPS" and the slice information is signalled in the PPS.

In VVC (e.g., VVC draft 9), flag 1250 ("pps_single_slice_per_subpic_flag") specifies whether each subpicture includes one or more rectangular slices. As a result, flag 1250 is relevant when the rectangular slice mode is applied. When flag 1250 is not present, the value of flag 1250 can be determined to be equal to 1. However, as shown in FIG. 12, the signalling of flag 1250 ("pps_single_slice_per_subpic_flag") may be skipped under two different scenarios. In the first scenario, PPS flag 1210 ("pps_no_pic_partition_flag") is equal to 1, and flags and syntax elements associated with slice partitioning are skipped. In the second scenario, flag 1240 ("pps_rect_slice_flag") is equal to 0, indicating that the raster-scan slice mode is applied, and flag 1250 ("pps_single_slice_per_subpic_flag") is not relevant. Accordingly, it is not sensible to determine the value of flag 1250 ("pps_single_slice_per_subpic_flag"), under the second scenario.

Therefore, in some embodiments, when not presented, the value of flag 1250 is determined when the rectangular slice mode is applied, and is not determined when the rater-scan slice mode is applied. Accordingly, flag 1250 can be properly determined under the rectangular slice mode when not presented in the PPS, and would not be determined under the irrelevant rater-scan slice mode. Thus, the coding performance and consistency can be improved. For example, the semantic for flag 1250 can be modified to reflect that flag 1250 ("pps_single_slice_per_subpic_flag") equal to 1 specifies that each subpicture contains one and only one rectangular slice. Flag 1250 ("pps_single_slice_per_subpic_flag") equal to 0 specifies that each subpicture may contain one or more rectangular slices. When PPS flag 1210 ("pps_no_pic_partition_flag") is equal to 1, the value of flag 1250 is determined to be equal to 1.

In VVC (e.g., VVC draft 9), when syntax element 1262 ("pps_slice_width_in_tiles_minus1[i]") and syntax element 1264 ("pps_slice_height_in_tiles_minus1[i]") are not present, syntax elements 1262, 1264 are determined to be equal to 0. However, in some semantics, the range of the index i is not clearly specified. Moreover, in some embodiments, syntax elements 1262 and 1264 indicate the width and height of i-th slice, so the range of the index i is from 0 to syntax element 1252 (e.g., the number of slices minus 1). However, for the index i equal to syntax element 1252 ("pps_num_slices_in_pic_minus1"), the value of syntax element 1262 ("pps_slice_width_in_tiles_minus1[i]") and syntax element 1264 ("pps_slice_height_in_tiles_minus1[i]") are not determined to be equal to 0. Accordingly, it would be desired to clearly specify the range of the index i of which syntax elements 1262 and 1264 are determined to be equal to 0.

Embodiments of the present disclosure provide updated semantics for syntax elements 1262 and 1264. In some embodiments, the semantic for syntax elements 1262 and 1264 can be modified to reflect that syntax element 1262 plus 1 specifies the width of the i-th rectangular slice in units of tile columns, and the value of syntax element 1262 shall be in the inclusive range of 0 to NumTileColumns−1. When not present for the index i in the range of 0 to syntax element 1252 minus 1, the value of syntax element 1262 is determined to be equal to 0.

Similarly, syntax element 1264 plus 1 specifies the height of the i-th rectangular slice in units of tile rows when syntax element 1266 is equal to 0. The value of syntax element 1264 shall be in the inclusive range of 0 to NumTileRows−1. When not present for the index i in the range of 0 to syntax element 1252 minus 1, the value of syntax element 1264 can be determined to be equal to 0 when SliceTopLeftTileIdx[i]/NumTileColumns is equal to NumTileRows−1. Otherwise, the value of syntax element 1264 for index i is determined to be equal to the value of syntax element 1264 for index (i−1) ("pps_slice_height_in_tiles_minus1[i−1]").

As shown in FIG. 12, in some embodiments, syntax element 1266 ("pps_num_exp_slices_in_tile[i]") specifies the number of explicitly provided slice heights for the slices in the tile containing the i-th slice. If syntax element 1266 ("pps_num_exp_slices_in_tile[i]") is equal to 0, the tile containing the i-th slice is not split into multiple slices. If syntax element 1266 ("pps_num_exp_slices_in_tile[i]") is not equal to 0 (e.g., syntax element 1266 ("pps_num_exp_slices_in_tile[i]") is greater than 0), the tile containing the i-th slice may or may not be split into multiple slices. Moreover, when syntax element 1266 ("pps_num_exp_slices_in_tile[i]") is greater than 0, syntax element 1268 ("pps_exp_slice_height_in_ctus_minus1[i][j]") plus 1 specifies the height of the j-th rectangular slice in the tile containing the i-th slice, in units of CTU rows, for the index j in an inclusive range of 0 to syntax element 1266 ("pps_num_exp_slices_in_tile[i]") minus 1. The value of syntax element 1268 ("pps_exp_slice_height_in_ctus_minus1[i][j]") is in an inclusive range of 0 to RowHeight[SliceTopLeftTileIdx[i]/NumTileColumns]−1.

In a scenario that a tile only includes one slice, two different signaling methods may be applied. In the first method, syntax element 1266 ("pps_num_exp_slices_in_tile[i]") is equal to 0 and the signaling of syntax element 1268 ("pps_exp_slice_height_in_ctus_minus1[i][j]") is skipped. In the second method, syntax element 1266 ("pps_num_exp_slices_in_tile[i]") is equal to 1 and pps_exp_slice_height_in_ctus_minus1[i][0] is equal to RowHeight[SliceTopLeftTileIdx[i]/NumTileColumns]−1 (e.g., the height of tile minus 1). Both signaling methods indicate that the tile includes only one slice.

In some embodiments, the redundancy in the signaling methods mentioned above can be removed by modifying the syntax elements and their semantics. Embodiments of the present disclosure provide updated semantics for PPS syntax. FIG. 30 shows an exemplary modified coding syntax table of a portion of PPS syntax structure 3000, consistent with some embodiments of the disclosure. As shown in FIG. 30, changes from the previous syntax shown in FIG. 12 are shown in highlighted patterns, with proposed deleted syntax being further shown in strikethrough.

Compared to the SPS syntax shown in FIG. 12, in some embodiments, as shown in FIG. 30, syntax element 1266 ("pps_num_exp_slices_in_tile[i]") is replaced with a syntax element 3066 ("pps_num_exp_slices_in_tile_minus1[i]") (e.g., pps_num_exp_slices_in_tile[i] minus 1). Accordingly, the first signaling method is removed. When a tile includes one slice, an encoder signals syntax element 3066 ("pps_num_exp_slices_in_tile_minus1[i]") to be equal to 0 and then signals syntax element 1268 (e.g., "pps_exp_slice_height_in_ctus_minus1[i][0]") to be equal to the height of the tile minus 1.

In the syntax of FIG. 30, syntax element 3066 plus 1 specifies the number of explicitly provided slice heights for the slices in the tile containing the i-th slice (i.e., the tile with tile index equal to SliceTopLeftTileIdx[i]). The value of syntax element 3066 shall be in the inclusive range of 0 to the height of the corresponding tile (RowHeight[SliceTopLeftTileIdx[i]/NumTileColumns]) minus 2. When not present, the value of syntax element 3066 is determined to be equal to 0.

In the syntax of FIG. 30, syntax element 1268 plus 1 specifies the height of the j-th rectangular slice in the tile containing the i-th slice, in units of CTU rows, for index j in the inclusive range of 0 to syntax element 3066 ("pps_num_exp_slices_in_tile_minus1[i]"). Syntax element "pps_exp_slice_height_in_ctus_minus1[i][pps_num_exp_slices_in_tile_minus1[i]]" is also used to derive the heights of the rectangular slices in the tile containing the i-th slice with the index greater than syntax element 3066 as specified herein.

Figure 31A:
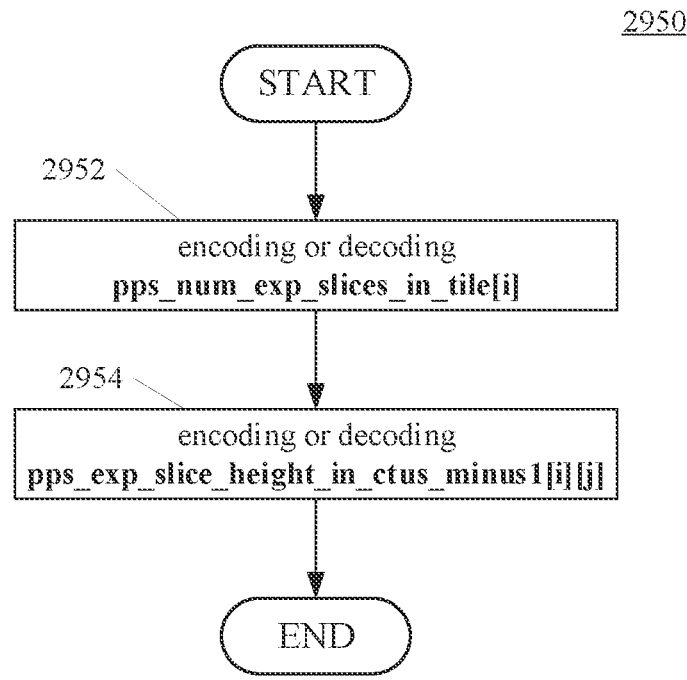
FIG. 31A and FIG. 31B illustrate exemplary detailed operations of steps in method of FIG. 29, consistent with some embodiments of the disclosure.
Figure 31B:
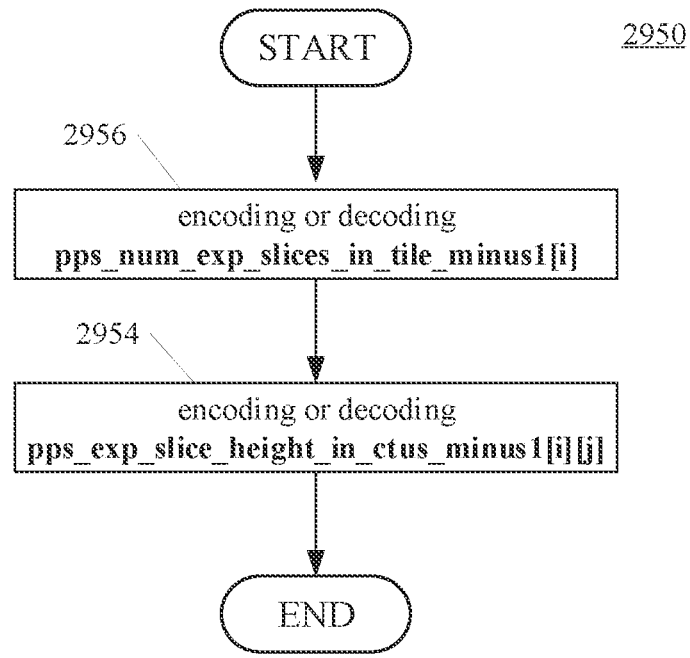

FIG. 31A and FIG. 31B respectively illustrate exemplary detailed operations of encoding or decoding the slice information in the PPS in step 2950 of method 2900 in FIG. 29, consistent with some embodiments of the disclosure. When the syntax of FIG. 12 is applied, as shown in FIG. 31A, step 2950 includes steps 2952 and 2954. At step 2952, the apparatus encodes or decodes syntax element 1266 ("pps_num_exp_slices_in_tile[i]") specifying the number of explicitly provided slice heights for the slices in the tile containing the i-th slice. At step 2954, the apparatus encodes or decodes syntax element 1268 ("pps_exp_slice_height_in_ctus_minus1[i][j]"). Syntax element 1268 plus 1 specifies the height of the j-th rectangular slice in the tile containing the i-th slice.

When the modified syntax of FIG. 30 is applied, as shown in FIG. 31B, step 2950 includes steps 2956 and 2954. At step 2956, the apparatus encodes or decodes syntax element 3066 ("pps_num_exp_slices_in_tile_minus1[i]"). Syntax element 3066 plus 1 specifies the number of explicitly provided slice heights for the slices in the tile containing the i-th slice.

Figure 32:
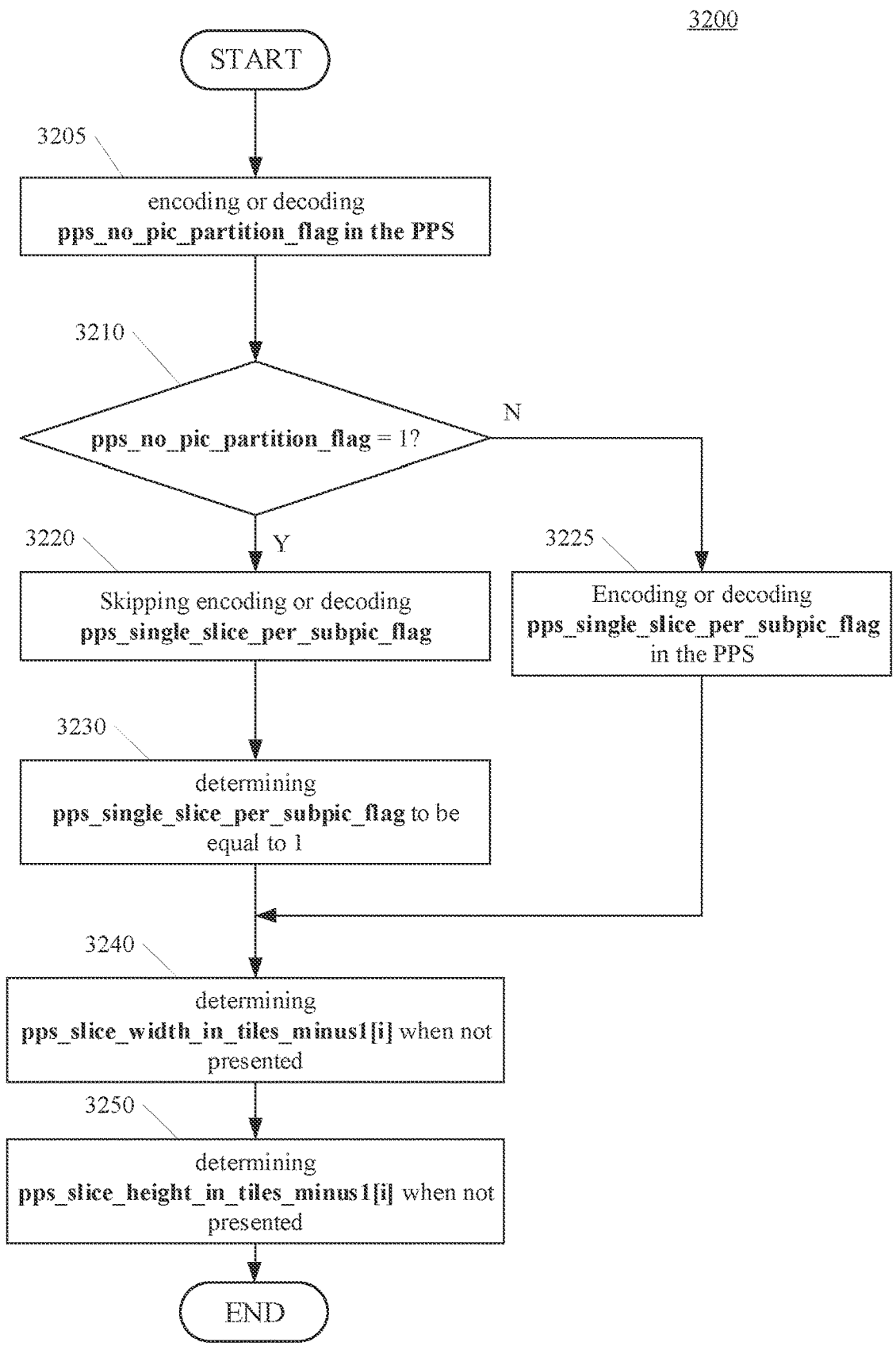
FIG. 32 illustrates a flowchart of an exemplary video encoding or decoding method, consistent with some embodiments of the disclosure.

FIG. 32 illustrates a flowchart of an exemplary video encoding or decoding method 3200, consistent with some embodiments of the disclosure. By applying video encoding or decoding method 3200, one or more PPS syntax elements or flags can be signaled conditionally based on the value of other syntax element(s) or flag(s), which reduces the number of the output bits and achieves a higher coding performance. When not signaled in the PPS, values of PPS syntax element(s) or flag(s) can be determined or assigned accordingly. Similar to methods 2700A-2700C and 2900, method 3200 can be performed by an encoder or a decoder, which can be implemented as one or more software or hardware components of an apparatus (e.g., apparatus 400 in FIG. 4) for encoding or transcoding a video sequence, or decoding the bitstream to reconstruct a video stream. For example, one or more processors (e.g., processor 402 in FIG. 4) can perform method 3200.

At step 3205, the apparatus is configured to encode or decode, in the PPS, the PPS flag 1210 ("pps_no_pic_partition_flag") for indicating whether the picture referring to the PPS is partitioned. As explained above, in some embodiments, for pictures within the same CLVS, different PPSs can independently signal PPS flag 1210 with different values. For example, the apparatus can encode or decode, in a first PPS, a first flag indicating whether a first picture referring to the first PPS is partitioned into tiles or slices, and encode or decode, in a second PPS, a second flag indicating whether a second picture referring to the second PPS is partitioned, in which the first flag and the second flag have different values.

At step 3210, the apparatus determines whether the picture referring to the PPS is unpartitioned based on the value of PPS flag 1210. When PPS flag 1210 is equal to one (step 3210—Yes), the picture referring to the PPS is unpartitioned, and the apparatus performs steps 3220 and 3230 to skip encoding or decoding flag 1250, and determine the value of flag 1250 to indicate that each subpicture includes the single rectangular slice. For example, at step 3230, flag 1250 can be determined to one. When PPS flag 1210 is equal to zero (step 3210—No), the apparatus performs step 3225 to encode or decode flag 1250.

After the value of flag 1250 is determined or encoded/decoded in step 3230 or step 3225, at step 3240, for index i in a range of zero to an upper bound value equal to the number of rectangular slices in the picture minus two, when syntax element 1262 ("pps_slice_width_in_tiles_minus1[i]") is missing in the PPS, the apparatus determines syntax element 1262 to be zero. Syntax element 1262 is a picture parameter associated with the width of the i-th rectangular slice for index i. In some embodiments, the value of syntax element 1262 is in the inclusive range of 0 to the number of columns of the corresponding tile (NumTileColumns) minus one.

As step 3250, for index i in a range of zero to an upper bound value equal to the number of rectangular slices in the picture minus two, when syntax element 1264 ("pps_slice_height_in_tiles_minus1[i]") is missing in the PPS, the apparatus determines the value of syntax element 1264. Syntax element 1264 is a picture parameter associated with the height of the i-th rectangular slice for index i. In some embodiments, the value of syntax element 1264 is in the inclusive range of 0 to the number of rows of the corresponding tile (e.g., NumTileRows) minus one. As discussed in above embodiments, when not presented, syntax element 1264 of the i-th rectangular slice may be determined to be zero or to be equal to the value of syntax element 1264 of the (i−1)-th rectangular slice.

In some other embodiments, the semantic for syntax element 1268 can also be modified to reflect that the value of syntax element 1268 is in the inclusive range of 0 to RowHeight[SliceTopLeftTileIdx[i]/NumTileColumns] minus 2. Alternatively stated, syntax element 1268 is a picture parameter being encoded or decoded with an upper bound value of the height of the corresponding tile minus two.

As the maximum value of syntax element 1268 is reduce to the height of tile minus 2, the second signaling method is removed. Accordingly, when a corresponding tile contains a single slice, syntax element 1266 is encoded or decoded to be equal to 0. When a corresponding tile contains two or more slices, syntax element 1266 is encoded or decoded to be equal to or greater than 1.

As discussed above, in some embodiments, for rectangular slice within one tile, syntax element 1266 specifies the number of explicitly provided slice heights for the slices in the tile containing the i-th slice. When syntax element 1266 is greater than 0, syntax element 1268 plus 1 specifies the height of the j-th rectangular slice in the tile containing the i-th slice, in units of CTU rows, for index j in an inclusive range of 0 to syntax element 1266 minus 1. The value of syntax element 1268 is in an inclusive range of 0 to RowHeight[SliceTopLeftTileIdx[i]/NumTileColumns] minus 1.

It is noted that for each individual slice in the tile, each explicitly signaled slice height is within the range of 0 to the tile height. In addition, considering that the sum of the heights of all the slices within one tile should be equal to the height of the tile, the sum of the explictly signaled heights of slices is less than or equal to the height of tile. As the minimum height of slice is equal to 1, each explicitly signaled slice height minus 1 should be less than or equal to the tile height minus the total number of slices in the tile.

Embodiments of the present disclosure provide updated semantics for syntax element 1268. Accordingly, the range of each explictly signaled slice height can thus be reduced to a more accurate value. Particularly, the maximum value of syntax element 1268 ("pps_exp_slice_height_in_ctus_minus1[i][j]") can be changed to RowHeight[SliceTopLeftTileIdx[i]/NumTileColumns] minus the number of slice heights explicitly provided for the slices in the current tile.

When combined with embodiments shown in FIG. 12, the semantic for syntax element 1268 can be modified to reflect that the value of syntax element 1268 shall be in the inclusive range of 0 to RowHeight[SliceTopLeftTileIdx[i]/NumTileColumns] minus the value of syntax element 1266. Alternatively stated, the upper bound value of syntax element 1268 is the height of the corresponding tile minus the number of explicitly provided slice heights for slices in the corresponding tile.

When combined with embodiments shown in FIG. 30, which replace syntax element 1266 by syntax element 3066, the semantic for syntax element 1268 can be modified to reflect that the value of syntax element 1268 shall be in the inclusive range of 0 to RowHeight[SliceTopLeftTileIdx[i]/NumTileColumns] minus the value of syntax element 3066 and further minus one.

When combined with embodiments having the maximum value of syntax element 1268 being reduce to the height of tile minus 2, the function max(pps_num_exp_slices_in_tile[i], 2) that selects the greater one of syntax element 1266 ("pps_num_exp_slices_in_tile[i]") and 2 can be used, and the semantic for syntax element 1268 can further be modified to reflect that the value of syntax element 1268 shall be in the inclusive range of 0 to RowHeight[SliceTopLeftTileIdx[i]/NumTileColumns] minus max(pps_num_exp_slices_in_tile[i], 2). Alternatively stated, the upper bound value of syntax element 1268 is a smaller one of the height of the corresponding tile (e.g., RowHeight[SliceTopLeftTileIdx[i]/NumTileColumns]) minus two, or the height of the corresponding tile minus the number of slice heights explicitly provided in the corresponding tile (pps_num_exp_slices_in_tile[i]).

FIG. 33 shows an exemplary pseudocode including updated derivation of variables NumCtusInSlice, SliceTopLeftTileIdx, CtbAddrInSlice, and NumSlicesInTile, according to some embodiments of the present disclosure. As shown in FIG. 33, changes from the previous VVC are shown in highlighted patterns, with proposed deleted syntax being further shown in strikethrough.

FIG. 34 shows an exemplary pseudocode including updated derivation for variables NumCtusInSlice and CtbAddrInSlice, according to some embodiments of the present disclosure. As shown in FIG. 34, changes from the previous VVC are shown in italic, with proposed deleted syntax being further shown in strikethrough. In the pseudocode shown in FIG. 34, mistakes and one redundant line in the derivation of NumCtusInSlice[i] and CtbAddrInSlice[i][j] in the previous VVC pseudocode are corrected.

In view of above, as proposed in various embodiments of the present disclosure, by modifying SPS and PPS syntax elements related to tile/slice partitioning, the encoding/decoding methods can be consistent and efficient. In addition, by properly determining the values of syntax elements when the syntax elements are not signaled, the signaling of some syntax elements related to tile/slice partitioning can be skipped for some cases, which reduces the number of the output bits and therefore improves the coding efficiency.

While the various embodiments of the present disclosure are described with respect to the current VVC standard, it is appreciated that the various embodiments are applicable to other video coding technologies.

The embodiments may further be described using the following clauses:

1. A method for encoding or decoding video, comprising:
   encoding or decoding, in a plurality of picture parameter sets (PPS) associated with pictures of a coded layer video sequence (CLVS), corresponding first PPS flags indicating whether pictures are allowed to be partitioned into a plurality of tiles or slices, wherein:
   in a first PPS, a corresponding first PPS flag with a first value indicates a first picture of the CLVS is unpartitioned, and in a second PPS, another corresponding first PPS flag with a second value being different from the first value indicates that a second picture of the CLVS is allowed to be partitioned.

2. A method for encoding or decoding video, comprising:
   determining whether a number of tiles of a partitioned picture is greater than a threshold value, the threshold value being greater than one; and
   in response to the number of tiles of the partitioned picture being greater than the threshold value, encoding or decoding a second PPS flag associated with a slice mode being applied to the partitioned picture.

3. The method of clause 1 or clause 2, wherein the encoding or decoding the second PPS flag comprises:
   when a raster-scan slice mode is applied to the partitioned picture referring to the PPS, encoding or decoding the second PPS flag with a third value; or when a rectangular slice mode is applied to the partitioned picture referring to the PPS, encoding or decoding the second PPS flag with a fourth value different from the third value.

4. The method of clause 3, further comprising:
   when the rectangular slice mode is applied to the partitioned picture referring to the PPS, encoding or decoding one or more syntax elements specifying slice information in the PPS.

5. A method for encoding or decoding video, comprising:
   determining whether a picture is partitioned into a plurality of tiles or slices; and
   in response to a determination that the picture is allowed to be partitioned into the plurality of tiles or slices, encoding or decoding, in a picture parameter set (PPS), a first flag associated with a slice mode being applied to the picture referring to the PPS, wherein:
   when a raster-scan slice mode is applied to partition the picture, encoding or decoding the first flag with a first value; or when a rectangular slice mode is applied to partition the picture, encoding or decoding the first flag with a second value different from the first value.

6. The method of any of clauses 3-5, wherein: in the raster-scan slice mode, the picture is partitioned into a plurality of raster-scan slices and any of the raster-scan slices comprises a sequence of one or more complete tiles in a tile raster scan of the picture; and
   in the rectangular slice mode, the picture is partitioned into a plurality of rectangular slices, wherein one of the rectangular slices comprises one or more tiles covering a rectangular region of the picture, or one of the rectangular slices covers one or more consecutive rows of coding tree units of a tile.

7. The method of clause 5 or clause 6, further comprising:
   encoding or decoding a first picture parameter specifying a number of provided slice heights for slices in a corresponding tile minus one, the first picture parameter being equal to 0 if the corresponding tile contains a single slice.

8. The method of clause 7, wherein a value of the first picture parameter is in an inclusive range of 0 to a height of the corresponding tile minus two.

9. The method of any of clauses 5-8, further comprising:
   encoding or decoding a third picture parameter specifying the number of provided slice heights for slices in a corresponding tile, the third picture parameter being equal to 0 if the corresponding tile contains a single slice.

10. The method of clause 9, further comprising:
    encoding or decoding a second picture parameter specifying a height of a corresponding rectangular slice in the corresponding tile minus one.

11. The method of clause 10, wherein an upper bound value of the second picture parameter is the height of the corresponding tile minus two.

12. The method of clause 10, wherein an upper bound value of the second picture parameter is the height of the corresponding tile minus a fourth picture parameter, wherein the fourth picture parameter indicates the number of provided slice heights for slices in the corresponding tile.

13. The method of clause 10, wherein an upper bound value of the second picture parameter is the height of the corresponding tile minus a fifth picture parameter and further minus one,
    wherein the fifth picture parameter indicates the number of provided slice heights for slices in the corresponding tile minus one.

14. The method of clause 10, wherein an upper bound value of the second picture parameter is a smaller one of the height of the corresponding tile minus two or the height of the corresponding tile minus the number of provided slice heights in the corresponding tile.

15. A method for encoding or decoding video, comprising:
encoding or decoding, in a picture parameter set (PPS) associated with at least one picture of a coded layer video sequence (CLVS), a first PPS flag indicating whether the associated picture is allowed to be partitioned into a plurality of tiles or slices, wherein the first PPS flag being equal to a first value indicates that the associated picture is unpartitioned, or the first PPS flag being equal to a second value different from the first value indicates that the associated picture is allowed to be partitioned; and
when the first PPS flag is equal to the first value, skipping encoding or decoding, in the PPS, a second PPS flag indicating whether each subpicture of the associated picture comprises a single rectangular slice, and determining a value of the second PPS flag equal to a third value, wherein the second PPS flag equal to the third value indicates that each subpicture of the associated picture comprises a single rectangular slice.

16. A method for encoding or decoding video, comprising:
for an index i, encoding or decoding, in a picture parameter set (PPS) associated with at least one picture of a coded layer video sequence (CLVS), a first picture parameter associated with a width of an i-th rectangular slice; and
when the first picture parameter is not present in the PPS, determining the first picture parameter to be zero,
wherein the index i is in a range of zero to an upper bound value equal to a number of rectangular slices in the picture minus two.

17. The method of clause 16, further comprising:
for the index i, encoding or decoding a second picture parameter associated with a height of the i-th rectangular slice; and
when the second picture parameter is not present in the PPS for the index i, determining the second picture parameter to be zero or to be equal to the value of a third picture parameter associated with the height of the (i−1)-th rectangular slice.

18. A method for encoding or decoding video, comprising:
encoding or decoding, in a sequence parameter set (SPS) of a bitstream, a first SPS flag indicating whether one or more pictures in a coded layer video sequence (CLVS) referring to the SPS is partitioned into a plurality of tiles or slices; and
encoding or decoding, in a picture parameter set (PPS) associated with the SPS, a first PPS flag equal to the first SPS flag for indicating whether the picture referring to the PPS is partitioned.

19. The method of clause 18, further comprising:
in response to the first SPS flag indicating that the one or more pictures are unpartitioned, skipping encoding or decoding a second SPS flag in the SPS, the second SPS flag indicating whether subpicture information is present for the CLVS referring to the SPS.

20. The method of clause 18 or clause 19, further comprising:
in response to the first SPS flag indicating that the one or more pictures are unpartitioned, skipping encoding or decoding a first SPS sequence parameter associated with a number of subpictures in each picture in the CLVS referring to the SPS.

21. An apparatus, comprising:
a memory configured to store instructions; and
one or more processors configured to execute the instructions to cause the apparatus to:
encode or decode, in a plurality of picture parameter sets (PPS) associated with pictures of a coded layer video sequence (CLVS), corresponding first PPS flags indicating whether pictures are allowed to be partitioned into a plurality of tiles or slices, wherein:
in a first PPS, a corresponding first PPS flag with a first value indicates a first picture of the CLVS is unpartitioned, and in a second PPS, another corresponding first PPS flag with a second value being different from the first value indicates that a second picture of the CLVS is allowed to be partitioned.

22. An apparatus, comprising:
a memory configured to store instructions; and
one or more processors configured to execute the instructions to cause the apparatus to:
determine whether a number of tiles of a partitioned picture is greater than a threshold value, the threshold value being greater than one; and
in response to the number of tiles of the partitioned picture being greater than the threshold value, encode or decode a second PPS flag associated with a slice mode being applied to the partitioned picture.

23. The apparatus of clause 21 or clause 22, wherein the one or more processors are configured to execute the instructions to cause the apparatus to encode or decode the second PPS flag by:
when a raster-scan slice mode is applied to the partitioned picture referring to the PPS, encoding or decoding the second PPS flag with a third value; or when a rectangular slice mode is applied to the partitioned picture referring to the PPS, encoding or decoding the second PPS flag with a fourth value different from the third value.

24. The apparatus of clause 23, wherein the one or more processors are configured to execute the instructions to further cause the apparatus to:
when the rectangular slice mode is applied to the partitioned picture referring to the PPS, encode or decode one or more syntax elements specifying slice information in the PPS.

25. An apparatus, comprising:
a memory configured to store instructions; and
one or more processors configured to execute the instructions to cause the apparatus to:
determine whether a picture is partitioned into a plurality of tiles or slices; and
in response to a determination that the picture is allowed to be partitioned into the plurality of tiles or slices, encode or decode, in a picture parameter set (PPS), a first flag associated with a slice mode being applied to the picture referring to the PPS, wherein:
when a raster-scan slice mode is applied to partition the picture, encode or decode the first flag with a first value; or when a rectangular slice mode is applied to partition the picture, encode or decode the first flag with a second value different from the first value.

26. The apparatus of clause 25, wherein:
in the raster-scan slice mode, the picture is partitioned into a plurality of raster-scan slices and any of the raster-scan slices comprises a sequence of one or more complete tiles in a tile raster scan of the picture; and
in the rectangular slice mode, the picture is partitioned into a plurality of rectangular slices, wherein one of the rectangular slices comprises one or more tiles covering a rectangular region of the picture, or one of the rectangular slices covers one or more consecutive rows of coding tree units of a tile.

27. The apparatus of clause 25 or clause 26, wherein the one or more processors are configured to execute the instructions to further cause the apparatus to:
encode or decode a first picture parameter specifying a number of provided slice heights for slices in a corresponding tile minus one, the first picture parameter being equal to 0 if the corresponding tile contains a single slice.

28. The apparatus of clause 27, wherein a value of the first picture parameter is in an inclusive range of 0 to a height of the corresponding tile minus two.

29. The apparatus of any of clauses 25-28, wherein the one or more processors are configured to execute the instructions to further cause the apparatus to:
encode or decode a third picture parameter specifying the number of provided slice heights for slices in a corresponding tile, the third picture parameter being equal to 0 if the corresponding tile contains a single slice.

30. The apparatus of clause 29, wherein the one or more processors are configured to execute the instructions to further cause the apparatus to:
encode or decode a second picture parameter specifying a height of a corresponding rectangular slice in the corresponding tile minus one.

31. The apparatus of clause 30, wherein an upper bound value of the second picture parameter is the height of the corresponding tile minus two.

32. The apparatus of clause 30, wherein an upper bound value of the second picture parameter is the height of the corresponding tile minus a fourth picture parameter, wherein the fourth picture parameter indicates the number of provided slice heights for slices in the corresponding tile.

33. The apparatus of clause 30, wherein an upper bound value of the second picture parameter is the height of the corresponding tile minus a fifth picture parameter and further minus one,
wherein the fifth picture parameter indicates the number of provided slice heights for slices in the corresponding tile minus one.

34. The apparatus of clause 30, wherein an upper bound value of the second picture parameter is a smaller one of the height of the corresponding tile minus two or the height of the corresponding tile minus the number of provided slice heights in the corresponding tile.

35. An apparatus, comprising:
a memory configured to store instructions; and
one or more processors configured to execute the instructions to cause the apparatus to:
encode or decode, in a picture parameter set (PPS) associated with at least one picture of a coded layer video sequence (CLVS), a first PPS flag indicating whether the associated picture is allowed to be partitioned into a plurality of tiles or slices, wherein the first PPS flag being equal to a first value indicates that the associated picture is unpartitioned, or the first PPS flag being equal to a second value different from the first value indicates that the associated picture is allowed to be partitioned; and
when the first PPS flag is equal to the first value, skip encoding or decoding, in the PPS, a second PPS flag indicating whether each subpicture of the associated picture comprises a single rectangular slice, and determine a value of the second PPS flag equal to a third value, wherein the second PPS flag equal to the third value indicates that each subpicture of the associated picture comprises a single rectangular slice.

36. An apparatus, comprising:
a memory configured to store instructions; and
one or more processors configured to execute the instructions to cause the apparatus to:
for an index i, encode or decode a first picture parameter, in a picture parameter set (PPS) associated with at least one picture of a coded layer video sequence (CLVS), a first picture parameter associated with a width of an i-th rectangular; and
when the first picture parameter is not present in the PPS, determine the first picture parameter to be zero,
wherein the index i is in a range of zero to an upper bound value equal to a number of rectangular slices in the picture minus two.

37. The apparatus of clause 36, wherein the one or more processors are configured to execute the instructions to further cause the apparatus to:
for the index i, encode or decode a second picture parameter associated with a height of the i-th rectangular slice; and
when the second picture parameter is not present in the PPS for the index i, determine the second picture parameter to be zero or to be equal to the value of a third picture parameter associated with the height of the (i−1)-th rectangular slice.

38. An apparatus, comprising:
a memory configured to store instructions; and
one or more processors configured to execute the instructions to cause the apparatus to:
encode or decode, in a sequence parameter set (SPS) of a bitstream, a first SPS flag indicating whether one or more pictures in a coded layer video sequence (CLVS) referring to the SPS is partitioned into a plurality of tiles or slices; and
encode or decode, in a picture parameter set (PPS) associated with the SPS, a first PPS flag equal to the first SPS flag for indicating whether the picture referring to the PPS is partitioned.

39. The apparatus of clause 38, wherein the one or more processors are configured to execute the instructions to further cause the apparatus to:
in response to the first SPS flag indicating that the one or more pictures are unpartitioned, skip encoding or decoding a second SPS flag in the SPS, the second SPS flag indicating whether subpicture information is present for the CLVS referring to the SPS.

40. The apparatus of clause 38 or clause 39, wherein the one or more processors are configured to execute the instructions to further cause the apparatus to:
in response to the first SPS flag indicating that the one or more pictures are unpartitioned, skip encoding or decoding a first SPS sequence parameter associated with a number of subpictures in each picture in the CLVS referring to the SPS.

41. A non-transitory computer-readable storage medium storing a set of instructions that are executable by one or more processors of a device to cause the device to perform operations comprising:
encoding or decoding, in a plurality of picture parameter sets (PPS) associated with pictures of a coded layer video sequence (CLVS), corresponding first PPS flags indicating whether pictures are allowed to be partitioned into a plurality of tiles or slices, wherein:

in a first PPS, a corresponding first PPS flag with a first value indicates a first picture of the CLVS is unpartitioned, and in a second PPS, another corresponding first PPS flag with a second value being different from the first value indicates that a second picture of the CLVS is allowed to be partitioned.

42. A non-transitory computer-readable storage medium storing a set of instructions that are executable by one or more processors of a device to cause the device to perform operations comprising:

determining whether a number of tiles of a partitioned picture is greater than a threshold value, the threshold value being greater than one; and in response to the number of tiles of the partitioned picture being greater than the threshold value, encoding or decoding a second PPS flag associated with a slice mode being applied to the partitioned picture.

43. The non-transitory computer-readable storage medium of clause 41 or clause 42, wherein the set of instructions that are executable by the one or more processors of the device further causes the device to encode or decode the second PPS flag by:

when a raster-scan slice mode is applied to the partitioned picture referring to the PPS, encoding or decoding the second PPS flag with a third value; or when a rectangular slice mode is applied to the partitioned picture referring to the PPS, encoding or decoding the second PPS flag with a fourth value different from the third value.

44. The non-transitory computer-readable storage medium of clause 43, wherein the set of instructions that are executable by the one or more processors of the device further causes the device to perform operations comprising:

when the rectangular slice mode is applied to the partitioned picture referring to the PPS, encoding or decoding one or more syntax elements specifying slice information in the PPS.

45. A non-transitory computer-readable storage medium storing a set of instructions that are executable by one or more processors of a device to cause the device to perform operations comprising:

determining whether a picture is partitioned into a plurality of tiles or slices; and in response to a determination that the picture is allowed to be partitioned into the plurality of tiles or slices, encoding or decoding, in a picture parameter set (PPS), a first flag associated with a slice mode being applied to the picture referring to the PPS, wherein:

when a raster-scan slice mode is applied to partition the picture, encoding or decoding the first flag with a first value; or when a rectangular slice mode is applied to partition the picture, encoding or decoding the first flag with a second value different from the first value.

46. The non-transitory computer-readable storage medium of clause 45, wherein:

in the raster-scan slice mode, the picture is partitioned into a plurality of raster-scan slices and any of the raster-scan slices comprises a sequence of one or more complete tiles in a tile raster scan of the picture; and in the rectangular slice mode, the picture is partitioned into a plurality of rectangular slices, wherein one of the rectangular slices comprises one or more tiles covering a rectangular region of the picture, or one of the rectangular slices covers one or more consecutive rows of coding tree units of a tile.

47. The non-transitory computer-readable storage medium of clause 45 or clause 46, wherein the set of instructions that are executable by the one or more processors of the device further causes the device to perform operations comprising:

encoding or decoding a first picture parameter specifying a number of provided slice heights for slices in a corresponding tile minus one, the first picture parameter being equal to 0 if the corresponding tile contains a single slice.

48. The non-transitory computer-readable storage medium of clause 47, wherein a value of the first picture parameter is in an inclusive range of 0 to a height of the corresponding tile minus two.

49. The non-transitory computer-readable storage medium of any of clauses 45-48, wherein the set of instructions that are executable by the one or more processors of the device further causes the device to perform operations comprising:

encoding or decoding a third picture parameter specifying the number of provided slice heights for slices in a corresponding tile, the third picture parameter being equal to 0 if the corresponding tile contains a single slice.

50. The non-transitory computer-readable storage medium of clause 49, wherein the set of instructions that are executable by the one or more processors of the device further causes the device to perform operations comprising:

encoding or decoding a second picture parameter specifying a height of a corresponding rectangular slice in the corresponding tile minus one.

51. The non-transitory computer-readable storage medium of clause 50, wherein an upper bound value of the second picture parameter is the height of the corresponding tile minus two.

52. The non-transitory computer-readable storage medium of clause 50, wherein an upper bound value of the second picture parameter is the height of the corresponding tile minus a fourth picture parameter, wherein the fourth picture parameter indicates the number of provided slice heights for slices in the corresponding tile.

53. The non-transitory computer-readable storage medium of clause 50, wherein an upper bound value of the second picture parameter is the height of the corresponding tile minus a fifth picture parameter and further minus one, wherein the fifth picture parameter indicates the number of provided slice heights for slices in the corresponding tile minus one.

54. The non-transitory computer-readable storage medium of clause 50, wherein an upper bound value of the second picture parameter is a smaller one of the height of the corresponding tile minus two or the height of the corresponding tile minus the number of provided slice heights in the corresponding tile.

55. A non-transitory computer-readable storage medium storing a set of instructions that are executable by one or more processors of a device to cause the device to perform operations comprising:

encoding or decoding, in a picture parameter set (PPS) associated with at least one picture of a coded layer video sequence (CLVS), a first PPS flag indicating whether the associated picture is allowed to be partitioned into a plurality of tiles or slices, wherein the first PPS flag being equal to a first value indicates that the associated picture is unpartitioned, or the first PPS flag being equal to a second value different from the first value indicates that the associated picture is allowed to be partitioned; and when the first PPS flag is equal to the first value, skipping encoding or decoding, in the PPS, a second PPS flag indicating whether each subpicture of the associated picture comprises a single rectangular slice, and determining a value of the second PPS flag equal to a third value, wherein the second PPS flag equal to the third value indicates that each subpicture of the associated picture comprises a single rectangular slice.

56. A non-transitory computer-readable storage medium storing a set of instructions that are executable by one or more processors of a device to cause the device to perform operations comprising:

for an index i, encoding or decoding, in a picture parameter set (PPS) associated with at least one picture of a coded layer video sequence (CLVS), a first picture parameter associated with a width of an i-th rectangular slice; and when the first picture parameter is not present in the PPS, determining the first picture parameter to be zero, wherein the index i is in a range of zero to an upper bound value equal to a number of rectangular slices in the picture minus two.

57. The non-transitory computer-readable storage medium of clause 56, wherein the set of instructions that are executable by the one or more processors of the device further causes the device to perform operations comprising:

for the index i, encoding or decoding a second picture parameter associated with a height of the i-th rectangular slice; and when the second picture parameter is not present in the PPS for the index i, determining the second picture parameter to be zero or to be equal to the value of a third picture parameter associated with the height of the (i−1)-th rectangular slice.

58. A non-transitory computer-readable storage medium storing a set of instructions that are executable by one or more processors of a device to cause the device to perform operations comprising:

encoding or decoding, in a sequence parameter set (SPS) of a bitstream, a first SPS flag indicating whether one or more pictures in a coded layer video sequence (CLVS) referring to the SPS is partitioned into a plurality of tiles or slices; and encoding or decoding, in a picture parameter set (PPS) associated with the SPS, a first PPS flag equal to the first SPS flag for indicating whether the picture referring to the PPS is partitioned.

59. The non-transitory computer-readable storage medium of clause 58, wherein the set of instructions that are executable by the one or more processors of the device further causes the device to perform operations comprising:

in response to the first SPS flag indicating that the one or more pictures are unpartitioned, skipping encoding or decoding a second SPS flag in the SPS, the second SPS flag indicating whether subpicture information is present for the CLVS referring to the SPS.

60. The non-transitory computer-readable storage medium of clause 58 or clause 59, wherein the set of instructions that are executable by the one or more processors of the device further causes the device to perform operations comprising:

in response to the first SPS flag indicating that the one or more pictures are unpartitioned, skipping encoding or decoding a first SPS sequence parameter associated with a number of subpictures in each picture in the CLVS referring to the SPS.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream, the method comprising:
   decoding a first picture parameter set (PPS) flag in a first PPS associated with a coded layer video sequence (CLVS), the first PPS flag indicating whether picture partitioning is allowed for a picture referring to the first PPS;
   determining a value of a second PPS flag based on a value of the first PPS flag, the second PPS flag indicating a number of rectangular slices comprised in the picture referring to the first PPS or a subpicture of the picture referring to the first PPS;
   decoding a third PPS flag in the first PPS; and
   determining, based on a value of the third PPS flag, whether a raster-scan slice mode or a rectangular slice mode is applied to the picture referring to the first PPS.

2. The method of claim 1, further comprising:
   in response to the first PPS flag indicating that no picture partitioning is allowed for the picture referring to the first PPS, determining that the picture referring to the first PPS comprises only one rectangular slice.

3. The method of claim 1, further comprising:
   in response to the value of the first PPS flag being equal to 1, determining that the value of the second PPS flag is equal to 1.

4. The method of claim 1, wherein the second PPS flag is not present in the first PPS.

5. The method of claim 1, further comprising:
   decoding a fourth PPS flag in a second PPS associated with the CLVS, the third PPS flag indicating whether picture partitioning is allowed for a picture referring to the second PPS;
   determining, based on the value of the first PPS flag, no picture partitioning is allowed for the picture referring to the first PPS; and
   determining, based on a value of the fourth PPS flag, picture partitioning is allowed for the picture referring to the second PPS.

6. The method of claim 5, wherein the first PPS flag and fourth PPS flag have different values.

7. The method of claim 1, further comprising:
   in response to the third PPS flag having a first value, determining that the raster-scan slice mode is applied to the picture referring to the first PPS; or
   in response to the third PPS flag having a second value, determining that the rectangular slice mode is applied to the picture referring to the first PPS.

8. A method of encoding a video sequence into a bitstream, the method comprising:
   encoding, in a first picture parameter set (PPS) associated with a coded layer video sequence (CLVS), a first PPS flag indicating whether picture partitioning is allowed for a picture referring to the first PPS;
   determining, based on a value of the first PPS flag, whether to encode a second PPS flag indicating a number of rectangular slices comprised in the picture referring to the first PPS or a subpicture of the picture referring to the first PPS; and
   in response to the first PPS flag indicating that no picture partitioning is allowed for the picture referring to the first PPS, skipping encoding the second PPS flag.

9. The method of claim 8, further comprising:
   encoding, in a second PPS associated with the CLVS, a third PPS flag indicating whether picture partitioning is allowed for a picture referring to the second PPS,
   wherein the encoding of the first PPS flag and third PPS flag comprises: setting the first PPS flag and the third PPS flag to have different values.

10. The method of claim 8, further comprising:
    encoding a fourth PPS flag in the first PPS,
    wherein the encoding of the fourth PPS flag comprises: setting a value of the fourth PPS flag based on whether a raster-scan slice mode or a rectangular slice mode is applied to the picture referring to the first PPS.

11. The method of claim 10, further comprising:
    in response to the raster-scan slice mode being applied to the picture referring to the first PPS, setting the fourth PPS flag to have a first value; or
    in response to the rectangular slice mode being applied to the picture referring to the first PPS, setting the fourth PPS flag to have a second value.

12. A non-transitory computer-readable storage medium storing a bitstream associated with a video sequence, wherein the bitstream comprises:
    a first picture parameter set (PPS) associated with a coded layer video sequence (CLVS), wherein:
    the first PPS comprises a first PPS flag indicating whether picture partitioning is allowed for a picture referring to the first PPS, and
    a value of the first PPS flag is used for determining a value of a second PPS flag, the second PPS flag indicating a number of rectangular slices comprised in the picture referring to the first PPS or a subpicture of the picture referring to the first PPS;
    wherein the first PPS comprises:
    a third PPS flag, wherein a value of the third PPS flag is used for determining whether a raster-scan slice mode or a rectangular slice mode is applied to the picture referring to the first PPS.

13. The non-transitory computer-readable storage medium of claim 12, wherein:
    when the first PPS flag has a value indicating that no picture partitioning is allowed for the picture referring to the first PPS, the second PPS flag has a value indicating that the picture referring to the first PPS comprises only one rectangular slice.

14. The non-transitory computer-readable storage medium of claim 12, wherein:
    when the value of the first PPS flag is equal to 1, the value of the second PPS flag is equal to 1.

15. The non-transitory computer-readable storage medium of claim 12, wherein the bitstream comprises:
    a second PPS associated with the CLVS, wherein:
    the second PPS comprises a fourth PPS flag indicating whether picture partitioning is allowed for a picture referring to the second PPS, and
    the first PPS flag and fourth PPS flag have different values.

16. The non-transitory computer-readable storage medium of claim 15, wherein:
    the first PPS flag has a value indicating that no picture partitioning is allowed for the picture referring to the first PPS; and the fourth PPS flag has a value indicating that picture partitioning is allowed for the picture referring to the second PPS.

17. The non-transitory computer-readable storage medium of claim 12, wherein:
   a first value of the third PPS flag indicates that the raster-scan slice mode is applied to the picture referring to the first PPS; and
   a second value of the third PPS flag indicates that the rectangular slice mode is applied to the picture referring to the first PPS.

* * * * *